US012422775B2

(12) United States Patent
Lee et al.

(10) Patent No.: US 12,422,775 B2
(45) Date of Patent: Sep. 23, 2025

(54) UNLOCKING TONER CARTRIDGE BY CLICK OPERATION

(71) Applicant: Hewlett-Packard Development Company, L.P., Spring, TX (US)

(72) Inventors: Changwoo Lee, Seongnam Si (KR); Jaeil Yu, Seongnam Si (KR); Heonjoo Kim, Seongnam Si (KR); Jeongyeon Park, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/701,716

(22) PCT Filed: Apr. 5, 2022

(86) PCT No.: PCT/US2022/023401
§ 371 (c)(1),
(2) Date: Apr. 16, 2024

(87) PCT Pub. No.: WO2023/069135
PCT Pub. Date: Apr. 27, 2023

(65) Prior Publication Data

US 2025/0231517 A1 Jul. 17, 2025

(30) Foreign Application Priority Data

Oct. 21, 2021 (KR) ........................ 10-2021-0141415

(51) Int. Cl.
*G03G 15/08* (2006.01)
*G03G 21/16* (2006.01)

(52) U.S. Cl.
CPC ..... *G03G 21/1647* (2013.01); *G03G 15/0865* (2013.01); *G03G 21/1633* (2013.01); *G03G 21/1676* (2013.01)

(58) Field of Classification Search
CPC ........... G03G 15/0865; G03G 21/1633; G03G 21/1647; G03G 21/1676
See application file for complete search history.

(56) References Cited

U.S. PATENT DOCUMENTS 7,974,558 B2 * 7/2011 Choi .................. G03G 15/0877 399/258
8,064,783 B2 11/2011 Usui et al.
(Continued)

FOREIGN PATENT DOCUMENTS

EP 3710892 A1 9/2020
JP 2004-151209 A 5/2004
(Continued)

*Primary Examiner* — Sophia S Chen
(74) *Attorney, Agent, or Firm* — Brooks, Cameron & Huebsch, PLLC

(57) ABSTRACT

An example image forming apparatus includes a toner cartridge movable to a mounting position in which the toner cartridge is mounted to a mounting portion and a click position further proceeded from the mounting position in a mounting direction; an elastic member to apply elastic force to the toner cartridge in a direction returning from the click position to the mounting position; a locking member to selectively allow removal of the toner cartridge from the mounting portion in accordance with a click operation by which the toner cartridge is moved to the click position and the mounting position; and a click restricting member to selectively allow movement of the toner cartridge from the mounting position to the click position.

15 Claims, 22 Drawing Sheets

(56) References Cited

U.S. PATENT DOCUMENTS

| | | | |
|---|---|---|---|
| 2007/0183812 | A1 | 8/2007 | Takashima et al. |
| 2008/0080902 | A1 | 4/2008 | Saito et al. |
| 2010/0272452 | A1 | 10/2010 | Tsukijima |
| 2011/0058825 | A1 | 3/2011 | Tsukijima |
| 2019/0250551 | A1 | 8/2019 | Mizutani |
| 2021/0191309 | A1 | 6/2021 | Tanio et al. |
| 2021/0240127 | A1 | 8/2021 | Park et al. |

FOREIGN PATENT DOCUMENTS

| | | | |
|---|---|---|---|
| JP | 4603912 | B2 | 12/2010 |
| JP | 4894281 | B2 | 3/2012 |
| JP | 4948582 | B2 | 6/2012 |
| JP | 5602386 | B2 | 10/2014 |
| JP | 6670371 | B2 | 3/2020 |

* cited by examiner

UNLOCKING TONER CARTRIDGE BY CLICK OPERATION

BACKGROUND

An electrophotographic image forming apparatus may form a visible toner image on a photoconductor by providing toner to an electrostatic latent image formed on the photoconductor, and transfer the toner image to a print medium through an intermediate transfer medium or directly to the print medium to fix the transferred toner image on the print medium.

The image forming apparatus may include a toner cartridge removable from a main body. Based on the life of the toner cartridge ending, the toner cartridge may be replaced. In a case where a certain amount of toner contained inside the toner cartridge is consumed, the toner cartridge may be removed from the main body and a new toner cartridge may be mounted onto the main body.

BRIEF DESCRIPTION OF THE DRAWINGS

Various examples will be described below by referring to the following figures.

FIGS. 3 and 4 are cross-sectional diagrams illustrating a click restricting member according to an example wherein, FIG. 3 illustrates a state in which a blocking member is located at a second position according to an example, and FIG. 4 illustrates a state in which a blocking member is located at a first position according to an example.

FIGS. 8 to 10 are schematic perspective views showing a locking member according to an example wherein, FIG. 8 illustrates a state in which a door is located at a closing position according to an example, FIG. 9 illustrates a state in which a door is located at a click position according to an example, and FIG. 10 illustrates a state in which a door is located at an opening position according to an example.

FIGS. 14 and 15 are schematic perspective views showing an example of a locking member according to an example wherein, FIGS. 12 and 14 illustrate a state in which a rotational handle is located at a locking position according to an example, and FIGS. 13 and 15 illustrate a state in which a rotational handle is located at a releasing position according to an example.

FIGS. 16 to 18 are schematic perspective views of a click restricting member according to an example wherein, FIG. 16 illustrates a state in which a door is located at a closing position according to an example, FIG. 17 illustrates a state in which a door is located at a click position according to an example, and FIG. 18 illustrates a state in which a door is located at an opening position according to an example.

DETAILED DESCRIPTION

Figure 1:
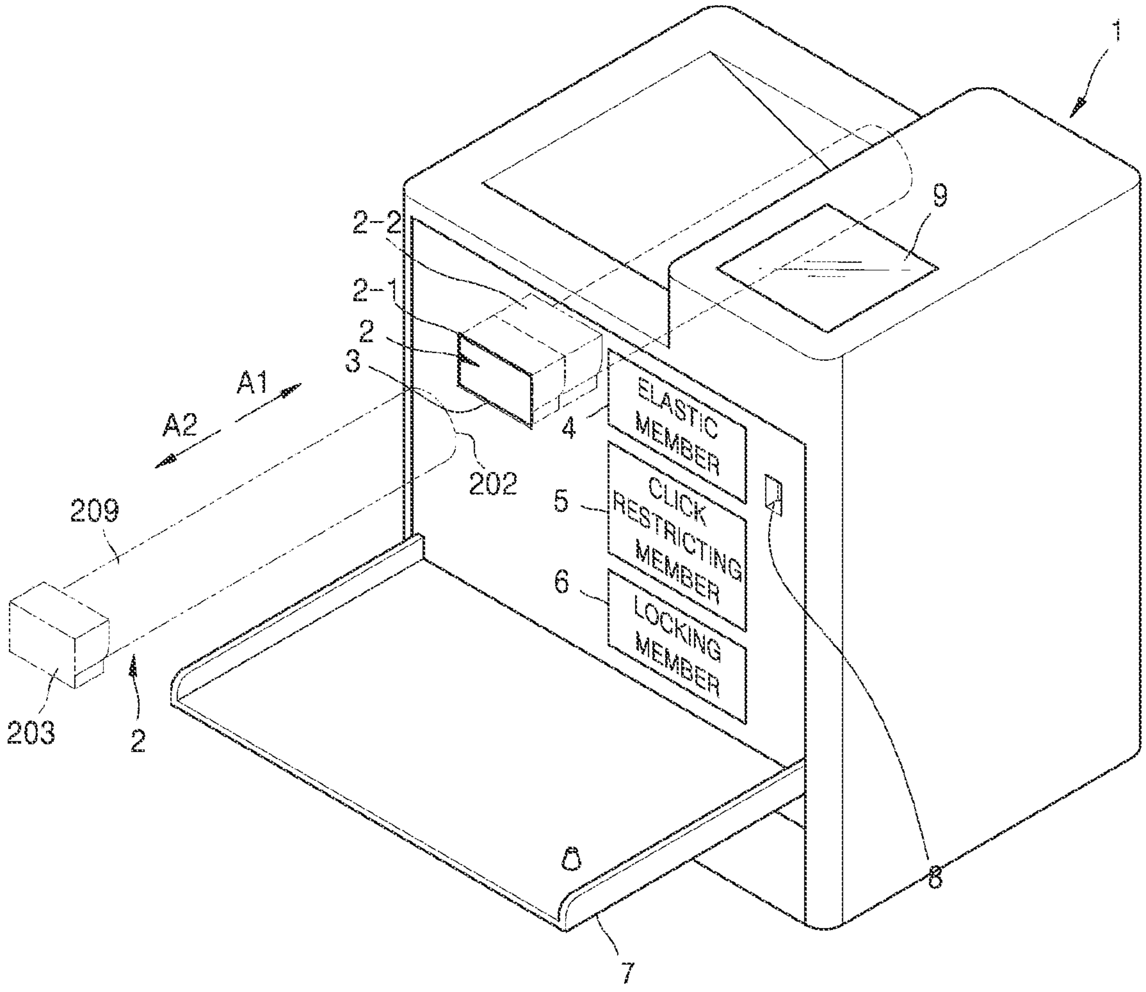
FIG. 1 is a schematic block diagram of an image forming apparatus according to an example.

An image forming apparatus to print an image on a print medium through electrophotography may include a replaceable toner cartridge. A main body of the image forming apparatus may include a mounting portion on which the toner cartridge may be mounted. To replace the toner cartridge, a main door of the main body may be opened so that an entrance of the mounting portion is exposed. The toner cartridge may be removed from the mounting portion, and, after mounting a new toner cartridge onto the mounting portion, the main door may be closed. According to a structure in which the toner cartridge is exposed based on the main door being opened, a user may not perform a proper replacement procedure and may replace the toner cartridge arbitrarily, causing an error in the image forming apparatus. In addition, a user may arbitrarily replace the toner cartridge before the toner contained in the toner cartridge is consumed to a certain level, which may lead to an unnecessary consumables expense.

In an example image forming apparatus, a toner cartridge may be movable between a mounting position at which the toner cartridge is mounted on the mounting portion, and a click position that further proceeds from the mounting position in a mounting direction. The image forming apparatus may include a locking member to selectively allow removal of the toner cartridge in accordance with a click operation of the toner cartridge. An elastic member may apply an elastic force to the toner cartridge in a direction returning from the click position to the mounting position. A click restricting member may selectively allow the click operation of the toner cartridge. In a case where a click of the toner cartridge is allowed by the click restricting member, removal of the toner cartridge may also be allowed, and in a case where a click of the toner cartridge is restricted, removal of the toner cartridge may not be allowed. Accordingly, arbitrary replacement of the toner cartridge may be prevented.

The locking member may be implemented in various forms. For example, a locking pin may be provided at the mounting portion and a locking path may be arranged at the toner cartridge. The locking path may guide the locking pin between a locking position, in which the toner cartridge is locked at the mounting position, and a releasing position, in which the removal of the toner cartridge is allowed in accordance with the click operation of the toner cartridge. For example, the image forming apparatus may include a door to open and close the mounting portion. The door may move between a closing position and a pressed position pushing the toner cartridge from the mounting position to the click position. The locking path may be arranged at the door. In an example, the toner cartridge may include a rotational handle. The rotational handle may rotate between the locking position, in which the toner cartridge is locked at the mounting position, and the releasing position, in which the removal of the toner cartridge is allowed. The locking member may be implemented by a trip groove provided at the mounting portion and a trip protrusion provided at the rotational handle. The trip protrusion may be held by the trip groove based on the toner cartridge being located at the mounting position and released from the trip groove based on the toner cartridge being located at the click position.

The click restricting member may be implemented in various forms. For example, the click restricting member may be driven by a coupler motor to drive the toner cartridge. For example, the coupler motor may be provided at the mounting portion and may be connected to the toner cartridge to drive the toner cartridge in a case where the toner cartridge is mounted on the mounting portion. A click restricting shaft may be connected to the coupler motor via an intervening uni-directional transmitting member. A blocking member may be connected to the click restricting shaft and may be moved between a first position and a second position at which movement of the toner cartridge to the click position is blocked/allowed.

The image forming apparatus according to an example may include a door to open and close the mounting portion on which the toner cartridge is mounted. The door may be moved between the closing position and the pressed position. The locking member may selectively allow the opening of the door in accordance with a press operation of the door. The click restricting member may selectively allow movement of the door to the pressed position.

The image forming apparatus according to an example may include the rotational handle arranged at the toner cartridge and movable between the holding position and the pressed position. The rotational handle may be rotated between the locking position, in which the toner cartridge is locked at the mounting position, and the releasing position, in which the removal of the toner cartridge is allowed. In the pressed position, the rotation of the rotational handle between the locking position and the releasing position may be allowed, and in the holding position, the rotation of the rotational handle between the locking position and the releasing position may not be allowed. The click restricting member may selectively allow the movement of the rotational handle to the pressed position.

Hereinafter, examples of the image forming apparatus are described with reference to the drawings. In the drawings, like reference numerals denote like members having the same function, and sizes of each component may be exaggerated for clarity and convenience in explanation.

Figure 2:
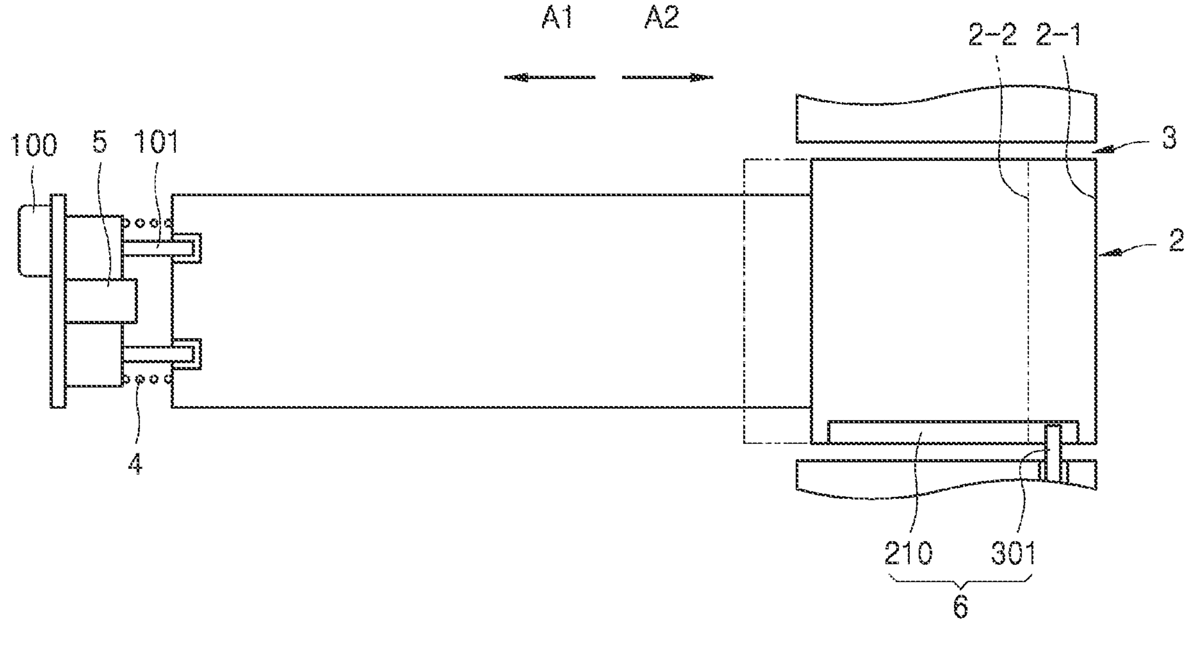
FIG. 2 illustrates a state in which a toner cartridge is mounted on a mounting portion according to an example.

FIG. 1 is a schematic block diagram of an image forming apparatus according to an example. FIG. 2 illustrates a state in which a toner cartridge is mounted on a mounting portion according to an example.

With reference to FIGS. 1 and 2, an image forming apparatus may include a mounting portion 3 and a toner cartridge 2 movable between a mounting position 2-1, in which the toner cartridge 2 is mounted on the mounting portion 3, and a click position 2-2 that further proceeds from the mounting position 2-1 in a mounting direction A1. The elastic member 4 may apply an elastic force to the toner cartridge 2 in a direction returning from the click position 2-2 to the mounting position 2-1. A click restricting member 5 may selectively allow the movement of the toner cartridge 2 between the mounting position 2-1 and the click position 2-2. A locking member 6 may selectively allow the removal of the toner cartridge 2 from the mounting portion 3 in accordance with the click operation of the toner cartridge 2, i.e., movement between the mounting position 2-1 and the click position 2-2. That is, the locking member 6 may lock the toner cartridge 2 at the mounting position 2-1 or release the locking so that the toner cartridge 2 may be removed in accordance with the click operation of the toner cartridge 2.

A main body 1 of the image forming apparatus may include a printing portion to print an image on a print medium through electrophotography. The printing portion may include a photoconductor, a charger, an optical scanner, a developing device, a transfer unit, a fuser, and the like. The optical scanner may form an electrostatic latent image on a surface of the photoconductor by scanning light modulated according to image information on the surface of the photoconductor charged by a uniform surface electric potential. The developing device may develop the electrostatic latent image into a visible toner image by supplying toner to the electrostatic latent image. The transfer unit may transfer the toner image formed on the surface of the photoconductor to the print medium. The transferred toner image may be attached to the print medium by an electrostatic force. The fuser may apply heat and pressure to the toner image to attach the toner image to the print medium. The toner cartridge 2 may be connected to the developing device and supply toner to the developing device. Based on toner contained in the toner cartridge 2 being consumed to a certain level, the toner cartridge 2 may be replaced, for example with a new toner cartridge.

The main body 1 of the image forming apparatus may include the mounting portion 3. The mounting portion 3 may have a shape of, for example, a chamber extending in the mounting direction A1. A main door 7 may partially expose the main body 1. A door opening/closing sensor 8 may detect opening and closing of the main door 7. In a case where the main door 7 is opened, the entrance of the mounting portion 3 is exposed, and by sliding the toner cartridge 2 in the mounting direction A1 or in a removing direction A2, the toner cartridge 2 may be mounted on/removed from the mounting portion 3. To prevent arbitrary removal of the toner cartridge 2 from the mounting portion 3 by a user, the locking member 6 may lock the toner cartridge 2 at the mounting position 2-1. In a case where the click of the toner cartridge 2 is allowed by the click restricting member 5, the locking of the toner cartridge 2 by the locking member 6 may be released by the click operation of the toner cartridge 2.

For example, in a case where a remaining amount of toner inside the toner cartridge 2 is less than a reference remaining amount corresponding to a replacement time of the toner cartridge 2, a toner cartridge 2 replacement message may be output through a user interface 9. In a case where the opening of the main door 7 is detected by the door opening/closing sensor 8, a message to request input of a command to execute the toner cartridge replacement may be output on the user interface 9. In a case where the command to execute the replacement of the toner cartridge is input through the user interface 9, the click restricting member 5 may be switched to a state in which the click of the toner cartridge 2 is allowed. The user may move the toner cartridge 2 to the click position 2-2 by pushing the toner cartridge 2 in the mounting direction A1. In a case where the force pushing the toner cartridge 2 is released, the toner cartridge 2 may be returned to the mounting position 2-1 by the elastic force of the elastic member 4. In this process, the locking of the toner cartridge 2 by the locking member 6 may be released. The user may remove the toner cartridge 2 from the mounting portion 3 by pulling the toner cartridge 2 in the removing direction A2. The toner cartridge 2 may be mounted on the mounting portion 3 by pushing the toner cartridge 2 in the mounting direction A1. In a case where the toner cartridge 2 is moved to the click position 2-2 by pushing the toner cartridge 2 in the mounting direction A1 and the force pushing the toner cartridge 2 is released, the toner cartridge 2 may be returned to the mounting position 2-1 from the click position 2-2 by the elastic force of the elastic member 4. During this process, the toner cartridge 2 may be locked at the mounting position 2-1 by the locking member 6. The main door 7 may be closed.

According to such a structure, as the locking of the toner cartridge 2 at the mounting position 2-1 may be released by an operation of the user interface 9, arbitrary replacement of the toner cartridge 2 may be prevented. As described in examples below, the click restricting member 5 may be driven by a coupler motor 100 to drive the toner cartridge 2. Accordingly, a separate actuator to release the locking of the toner cartridge 2, for example, a solenoid, etc. is not needed. Thus, an increase in the number of components to lock/release the toner cartridge 2 and an expense therefor may be prevented. Hereinafter, various examples of the click restricting member 5 and the locking member 6 are described.

Figure 3:
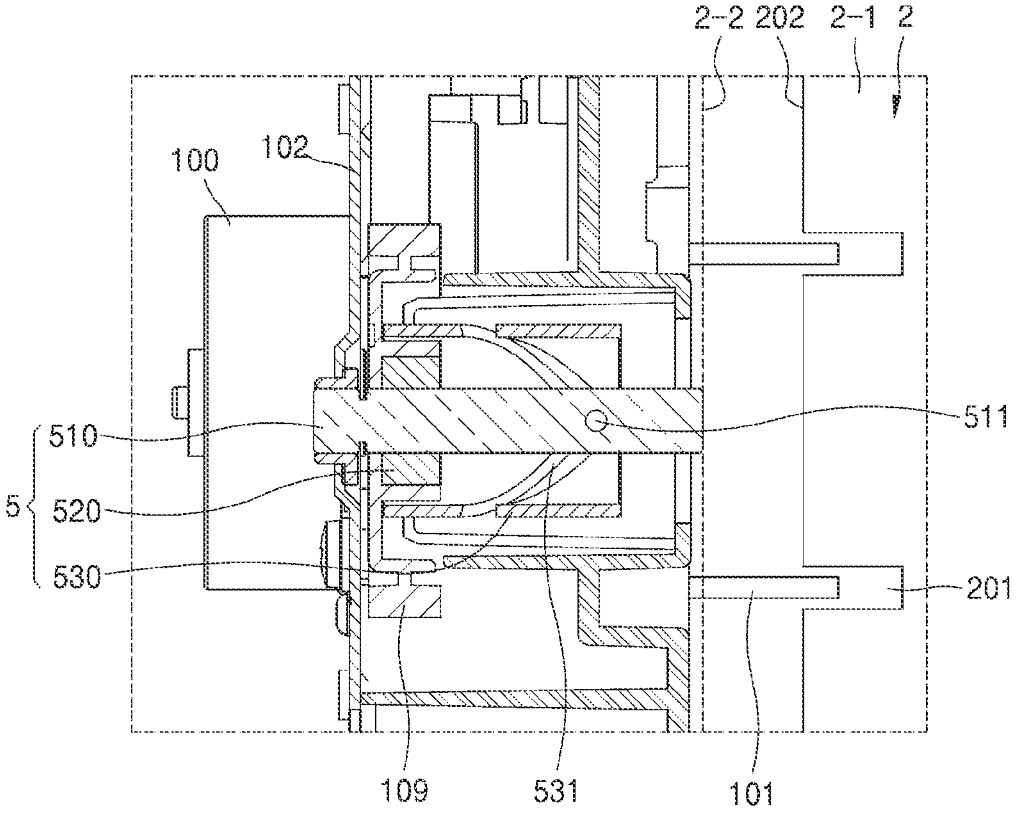
Figure 4:
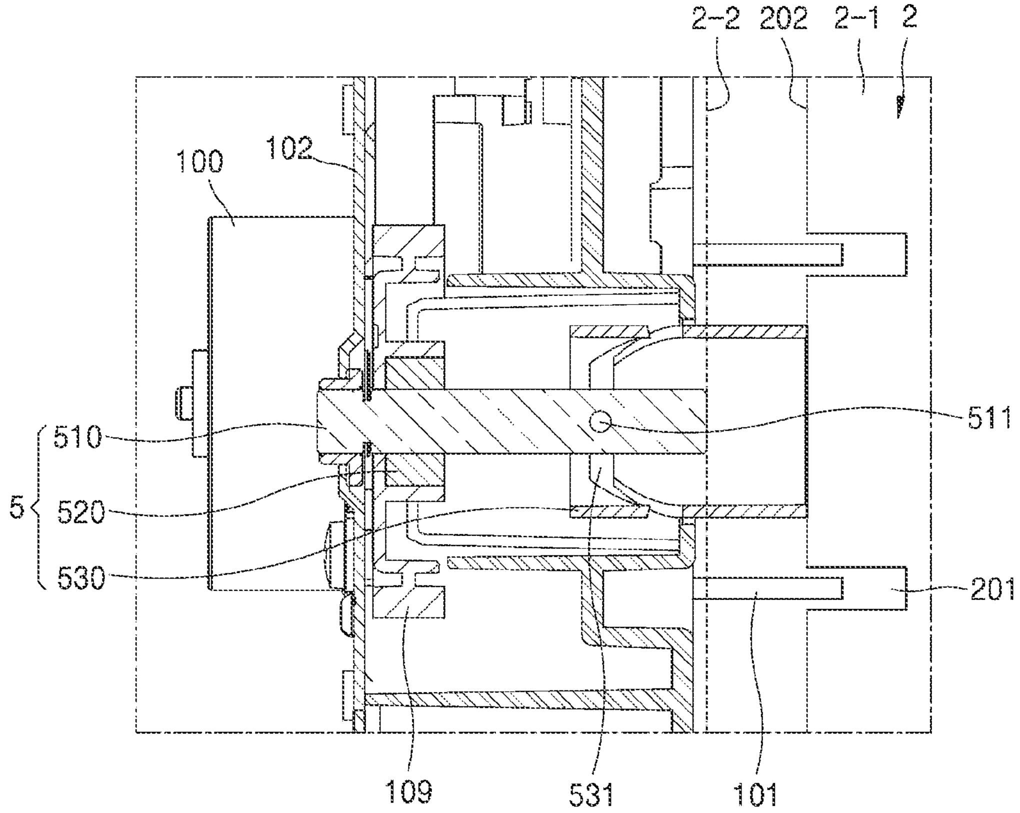

FIGS. 3 and 4 are cross-sectional diagrams illustrating a click restricting member according to an example wherein, FIG. 3 illustrates a state in which a blocking member is located at a second position according to an example, and FIG. 4 illustrates a state in which the blocking member is located at a first position according to an example.

With reference to FIGS. 2 to 4, the coupler motor 100 may be provided at the main body 1, for example, at the mounting portion 3. The coupler motor 100 may rotate a driving coupler 101 provided at the mounting portion 3. In a case where the toner cartridge 2 is mounted on the mounting portion 3, the driving coupler 101 may be connected to the toner cartridge 2. For example, the driving coupler 101 may be engaged with a driven coupler 201 provided at the toner cartridge 2 to deliver the rotation power of the coupler motor 100 to the driven coupler 201. In this manner, the toner cartridge 2 may be driven. In an example, the toner cartridge 2 may include a toner container 209 (FIG. 1) rotatable with respect to a front end portion 203 (FIG. 1). The driven coupler 201 may be provided at the toner cartridge 2, for example, at a rear end portion 202 of the toner container 209. In an example, the click restricting member 5 may be driven by the coupler motor 100. For example, the rotation power of the coupler motor 100 in one direction, for example, rotation power in a reverse direction may be delivered to the click restricting member 5 to drive the click restricting member 5.

For example, the click restricting member 5 may include a click restricting shaft 510 and a blocking member 530. The click restricting shaft 510 may be rotatably supported by a bracket 102 via a uni-directional bearing 520. In an example, the uni-directional bearing 520 may include a uni-directional power transmitting member to transmit the rotation power of the coupler motor 100 in one direction. In an example, the uni-directional bearing 520 may transmit the rotation power of the coupler motor 100 in a reverse direction to the click restricting shaft 510. For example, a gear 109 rotated by the coupler motor 100 may be supported by an outer ring of the uni-directional bearing 520, and the click restricting shaft 510 may be supported by an inner ring of the uni-directional bearing 520. The blocking member 530 may be connected to the click restricting shaft 510 and may be moved between a first position and a second position in which the movement of the toner cartridge 2 to the click position 2-2 is blocked/allowed. For example, the blocking member 530 may be moved in an axial direction according to the rotation of the click restricting shaft 510, and may be moved between the first position and the second position.

Figure 5:
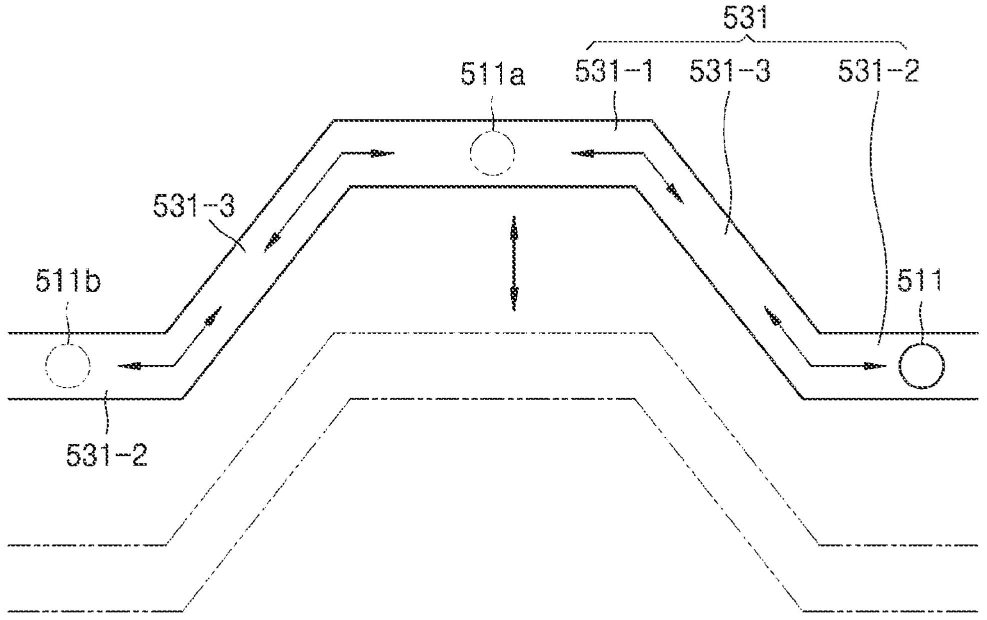
FIG. 5 is a schematic development view of a guide slot according to an example.

For example, the click restricting shaft 510 may include a pin 511, and the blocking member 530 may include a guide slot 531 into which the pin 511 may be inserted. FIG. 5 is a schematic development view of the guide slot 531 according to an example. With reference to FIG. 5, the guide slot 531 may include a first portion 531-1 and a second portion 531-2 perpendicular to the axial direction and spaced apart from each other in the axial direction as well as an inclined third portion 531-3 to connect the first portion 531-1 to the second portion 531-2. The first portion 531-1 may be close to the rear end portion 202 of the toner cartridge 2, and the second portion 531-2 may be far from the rear end portion 202 of the toner cartridge 2.

Although it is not shown in the drawings, a sensor to detect the state of the click restricting member 5, for example, a click allowing state and a click restricting state may be provided. The sensor may detect, for example, an amount of reverse rotation of the coupler motor 100. The sensor may also detect, for example, an amount of rotation of the gear 109 rotated by the coupler motor 100. The sensor may detect, for example, an amount of rotation of the click restricting shaft 510. The sensor may detect, for example, a position of the blocking member 530. In addition to this, the state of the click restricting member 5 may be detected by other various methods.

Example operations of the click restricting member 5 are described with reference to FIGS. 2 to 5. First, with reference to FIG. 5, as shown by a solid line, the pin 511 of the click restricting shaft 510 may be arranged at the second portion 531-2. As shown in FIG. 4, the blocking member 530 may be arranged at the first position in contact with the rear end portion 202 of the toner cartridge 2 located at the mounting position 2-1. In this state, in a case where the coupler motor 100 rotates in a forward direction, the driving coupler 101 may be rotated in the forward direction as well. As the forward rotation power of the coupler motor 100 is blocked by the uni-directional bearing 520, the click restricting shaft 510 may not be rotated. The blocking member 530 may remain at the first position. In the state shown in FIG. 4, even in a case where the toner cartridge 2 is pushed in the mounting direction A1, the toner cartridge 2 may be blocked by the blocking member 530 and may not be moved to the click position 2-2. The toner cartridge 2 may remain at the mounting position 2-1. In a case where the coupler motor 100 continues to rotate in the forward direction, the toner cartridge 2 may be driven through the driving coupler 101.

In the state shown in FIG. 4, in a case where the coupler motor 100 is rotated in a reverse direction, the gear 109 may also be rotated in the reverse direction. The reverse rotation power of the gear 109 may be delivered to the click restricting shaft 510 by the uni-directional bearing 520 and the click restricting shaft 510 may be rotated. The pin 511 of the click restricting shaft 510 may enter the third portion 531-3 from the second portion 531-2. During this process, the pin 511 may pull the third portion 531-3 in the axial direction, and the blocking member 530 may be moved in a direction proceeding away from the rear end portion 202 of the toner cartridge 2. In a case where the pin 511 enters the first portion 531-1 as shown in FIG. 5 (see 511*a*), the blocking member 530 may arrive at the second position as shown in FIG. 3. The blocking member 530 may be spaced from the rear end portion 202 of the toner cartridge 2 located at the mounting position 2-1. In this state, in a case where the toner cartridge 2 is pushed in the mounting direction A1, the toner cartridge 2 may be moved to the click position 2-2, as shown by a dashed line in FIG. 3.

In the state shown in FIG. 3, in a case where the coupler motor 100 is rotated in a reverse direction, the gear 109 may also be rotated in the reverse direction. The reverse rotation power of the gear 109 may be delivered to the click restricting shaft 510 by the uni-directional bearing 520, and the click restricting shaft 510 may be rotated. The pin 511 of the click restricting shaft 510 may enter the third portion 531-3 from the first portion 531-1. During this process, the pin 511 may push the third portion 531-3 in the axial direction, and the blocking member 530 may be moved toward the rear end portion 202 of the toner cartridge 2. In a case where the pin 511 enters the second portion 531-2 as shown in FIG. 5 (see 511*b*), the blocking member 530 may arrive at the first position as shown in FIG. 4. The blocking member 530 may be in contact with the rear end portion 202 of the toner cartridge 2 located at the mounting position 2-1. In this state, even in a case where the toner cartridge 2 is pushed in the mounting direction A1, the toner cartridge 2 may not be moved to the click position 2-2.

Figure 6:
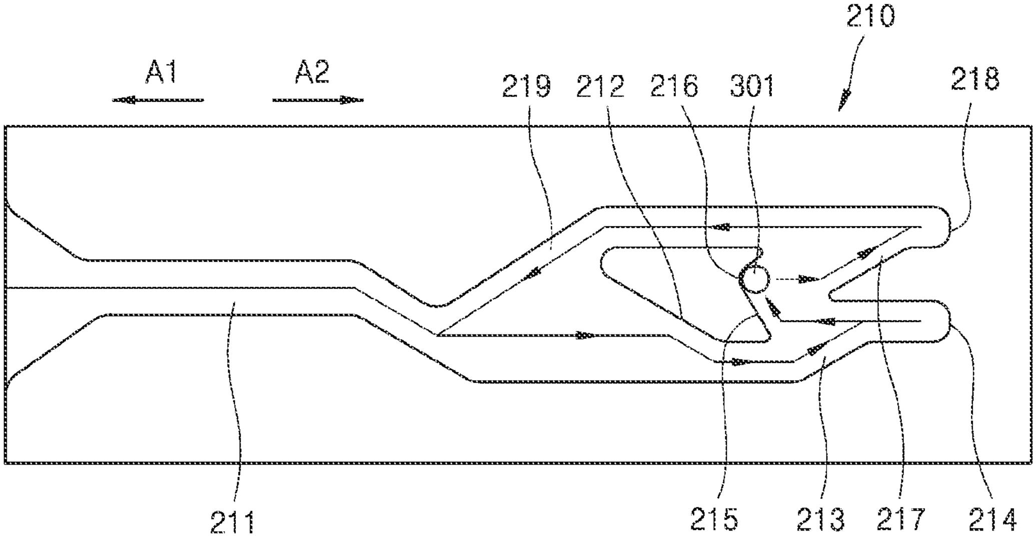
FIG. 6 is a plan view of a locking member according to an example.

FIG. 6 is a plan view of the locking member 6 according to an example. With reference to FIGS. 2 and 6, the locking member 6 may selectively allow removal of the toner cartridge 2 by locking/releasing the toner cartridge 2 at/from the mounting portion 3. For example, the locking member 6 may include a locking pin 301 provided at the mounting portion 3 and a locking path 210 arranged at the toner cartridge 2 to guide the locking pin 301 between the locking position and the releasing position. The locking path 210 may be arranged at an upper surface, a lower surface, or a lateral surface of the toner cartridge 2. In an example, the locking path 210 may have an overall shape extending in the mounting direction A1 and the removing direction A2. The locking pin 301 may be arranged at the upper surface, the lower surface, or the lateral surface of the mounting portion 3 opposing the locking path 210. The locking pin 301 may be provided at the mounting portion 3 so that the locking pin 301 may be moved in a direction perpendicular to a moving direction of the toner cartridge 2, i.e., a direction perpendicular to the mounting direction A1 and the removing direction A2. According to the example, the locking path 210 may be provided at a lower surface of the front end portion 203 of the toner cartridge 2, and the locking pin 301 may be provided at a lower surface of mounting portion 3 opposing the locking path 210.

The locking path 210 may be implemented in various forms. For example, the locking path 210 may include an entry portion 211, a first guiding portion 212, a second guiding portion 213, a first end portion 214, a third guiding portion 215, a locking portion 216, a fourth guiding portion 217, a second end portion 218, and a fifth guiding portion 219. In a case where the toner cartridge 2 is moved in the mounting direction A1 and mounted on the mounting portion 3, the locking pin 301 may enter the locking path 210 through the entry portion 211. The first guiding portion 212 and the second guiding portion 213 may have a shape in which the locking pin 301 is guided to the first end portion 214 in a case where the toner cartridge 2 is moved between the mounting position 2-1 and the click position 2-2. The third guiding portion 215 may have a shape in which the locking pin 301 is guided to the locking portion 216 in a case where the toner cartridge 2 is moved between the click position 2-2 and the mounting position 2-1. The fourth guiding portion 217 may have a shape in which the locking pin 301 is guided to the second end portion 218 in a case where the toner cartridge 2 is moved between the mounting position 2-1 and the click position 2-2. The fifth guiding portion 219 may have a shape in which the locking pin 301 is guided to the entry portion 211 in a case where the toner cartridge 2 is moved from the click position 2-2 in the removing direction A2 through the mounting position 2-1.

Figure 7:
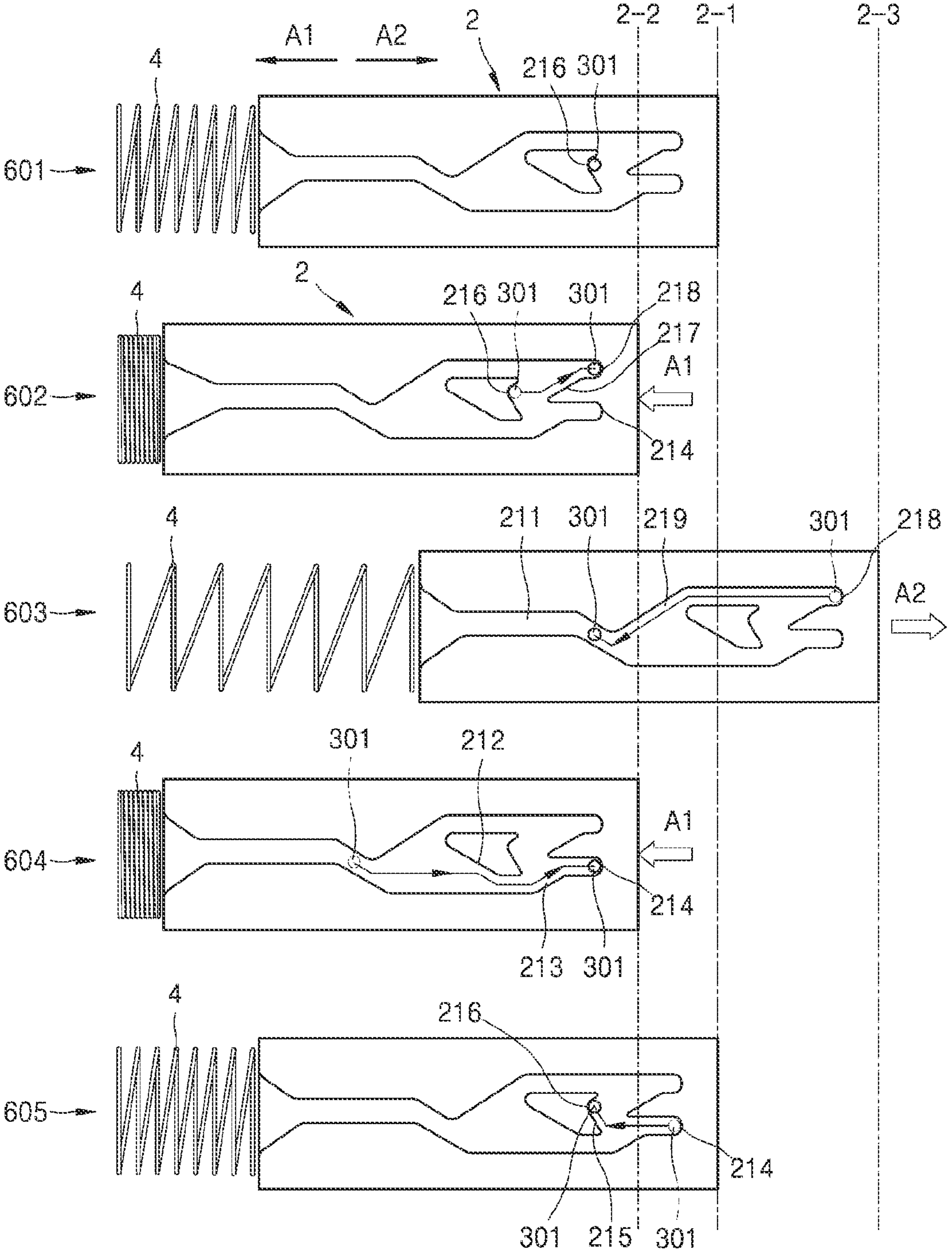
FIG. 7 illustrates an operation of locking/releasing a toner cartridge at/from a mounting position by a click operation of the toner cartridge according to an example.

FIG. 7 illustrates an example operation in which the locking member 6 locks/releases the toner cartridge 2 at/from the mounting position 2-1 by a click operation of the toner cartridge 2. FIG. 7 illustrates examples of the locking path 210, the locking pin 301, and the elastic member 4. With reference to FIGS. 1 to 7, an example process of removing the toner cartridge 2 is described.

Referring to FIG. 7, 601 denotes a state in which the toner cartridge 2 is locked at the mounting position 2-1. As the locking pin 301 is held by the locking portion 216, even in a case where the toner cartridge 2 is pulled in the removing direction A2, the toner cartridge 2 may not be removed. As shown in FIG. 4, in a state where the blocking member 530 is located at the first position, the toner cartridge 2 may be blocked by the blocking member 530 and thus may not be moved to the click position even in a case where the toner cartridge 2 is pushed in the mounting direction A1. Thus, the toner cartridge 2 may remain locked at the mounting position 2-1. During an image formation process, the coupler motor 100 may rotate in the forward direction and drive the toner cartridge 2. As the forward rotation power of the coupler motor 100 is blocked by the uni-directional bearing 520, the click restricting shaft 510 may not be rotated, and the blocking member 530 may remain at the first position.

For example, in a case where a remaining amount of toner inside the toner cartridge 2 is less than a reference remaining amount corresponding to the replacement time of the toner cartridge 2, a toner cartridge 2 replacement message may be output through the user interface 9. In a case where the opening of the main door 7 is detected by the door opening/closing sensor 8, a message to request input of a command to execute the toner cartridge replacement may be output on the user interface 9. In a case where the command to execute the toner cartridge replacement is input through the user interface 9, the coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to operations of the pin 511 of the click restricting shaft 510 and the guide slot 531 of the blocking member 530, the blocking member 530 may be moved to the second position apart from the rear end portion 202 of the toner cartridge 2 located at the mounting position 2-1 as shown in FIG. 3. In that case, the click operation of the toner cartridge 2 may become available.

In a case where the toner cartridge 2 is pushed in the mounting direction A1, the toner cartridge 2 may arrive at the click position 2-2 as denoted by the reference numeral 602 in FIG. 7. At this time, the locking pin 301 may be off the locking portion 216 and guided to the fourth guiding portion 217 to be located at the second end portion 218. Accordingly, the locking of the toner cartridge 2 may be released. The elastic member 4 may be compressed and elastically push the toner cartridge 2 in the removing direction A2. In this state, in a case where the force pushing the toner cartridge 2 in the mounting direction A1 is released, the toner cartridge 2 may be moved to the mounting position 2-1 by the elastic force of the elastic member 4. During this process, the locking pin 301 may be guided to the fifth guiding portion 219 and enter the entry portion 211. The toner cartridge 2 may pass through the mounting position 2-1 and may be moved to a popup position 2-3 in which the front end portion 203 protrudes from an exit of the mounting portion 3, as denoted by the reference numeral 603 in FIG. 7. The user may hold the front end portion 203 of the toner cartridge 2 and pull the toner cartridge 2 in the removing direction A2 to remove the toner cartridge 2 from the mounting portion 3.

To remount the toner cartridge 2 on the mounting portion 3, the rear end portion 202 of the toner cartridge 2 may be arranged at an entrance of the mounting portion 3 and the toner cartridge 2 may be pushed in the mounting direction A1. The locking pin 301 may enter the locking path 210 through the entry portion 211. In a case where the toner cartridge 2 is pushed in up to the click position 2-2 through the mounting position 2-1, the locking pin 301 may be guided to the first guiding portion 212 and the second guiding portion 213 and arrive at the first end portion 214 as denoted by the reference numeral 604 in FIG. 7. In this state, in a case where the force pushing the toner cartridge 2 in the mounting direction A1 is removed, the toner cartridge 2 may be moved in the removing direction A2 by the elastic force of the elastic member 4. The locking pin 301 may be guided to the third guiding portion 215. In a case where the toner cartridge 2 arrives at the mounting position 2-1, the locking pin 301 may be held by the locking portion 216, and the toner cartridge 2 may be locked at the mounting position 2-1, as denoted by the reference numeral 605 of FIG. 7.

In a case where the main door 7 is closed, the closing of the main door 7 may be detected by the door opening/closing sensor 8. The coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to operations of the pin 511 of the click restricting shaft 510 and the guide slot 531 of the blocking member 530, the blocking member 530 may be moved to the first position in contact with the rear end portion 202 of the toner cartridge 2 located at the mounting position 2-1 as shown in FIG. 4. The movement of the toner cartridge 2 to the click position 2-2 may be blocked. Thus, the toner cartridge 2 may remain locked at the mounting position 2-1.

Figure 8:
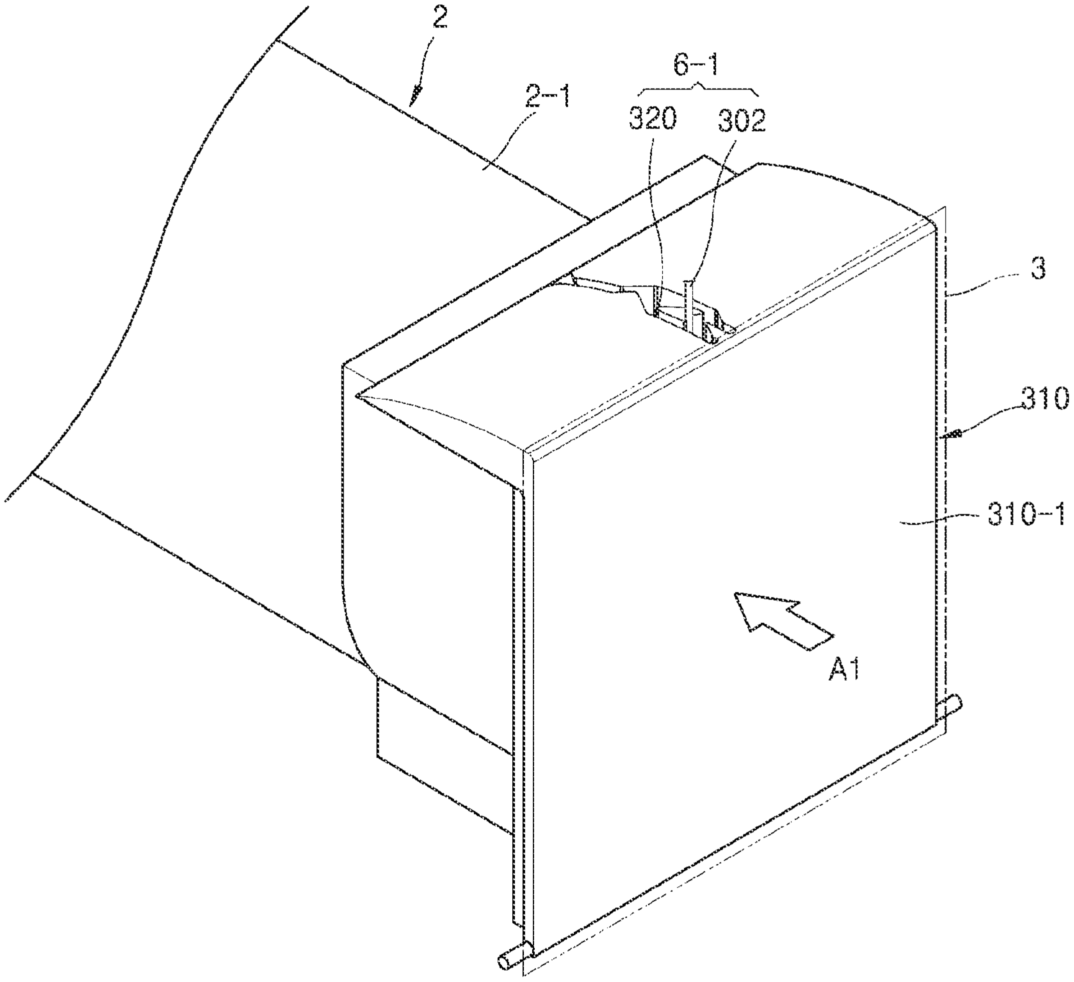
Figure 9:
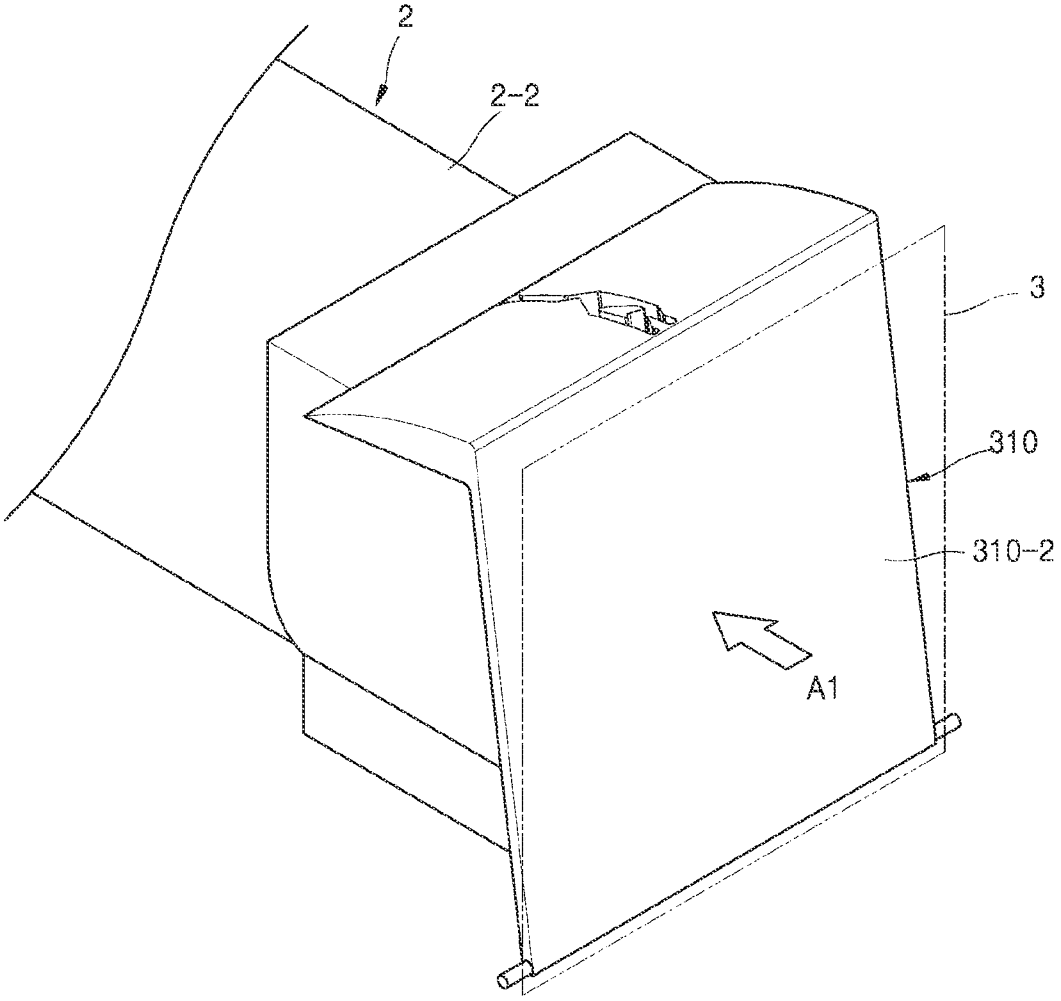
Figure 10:
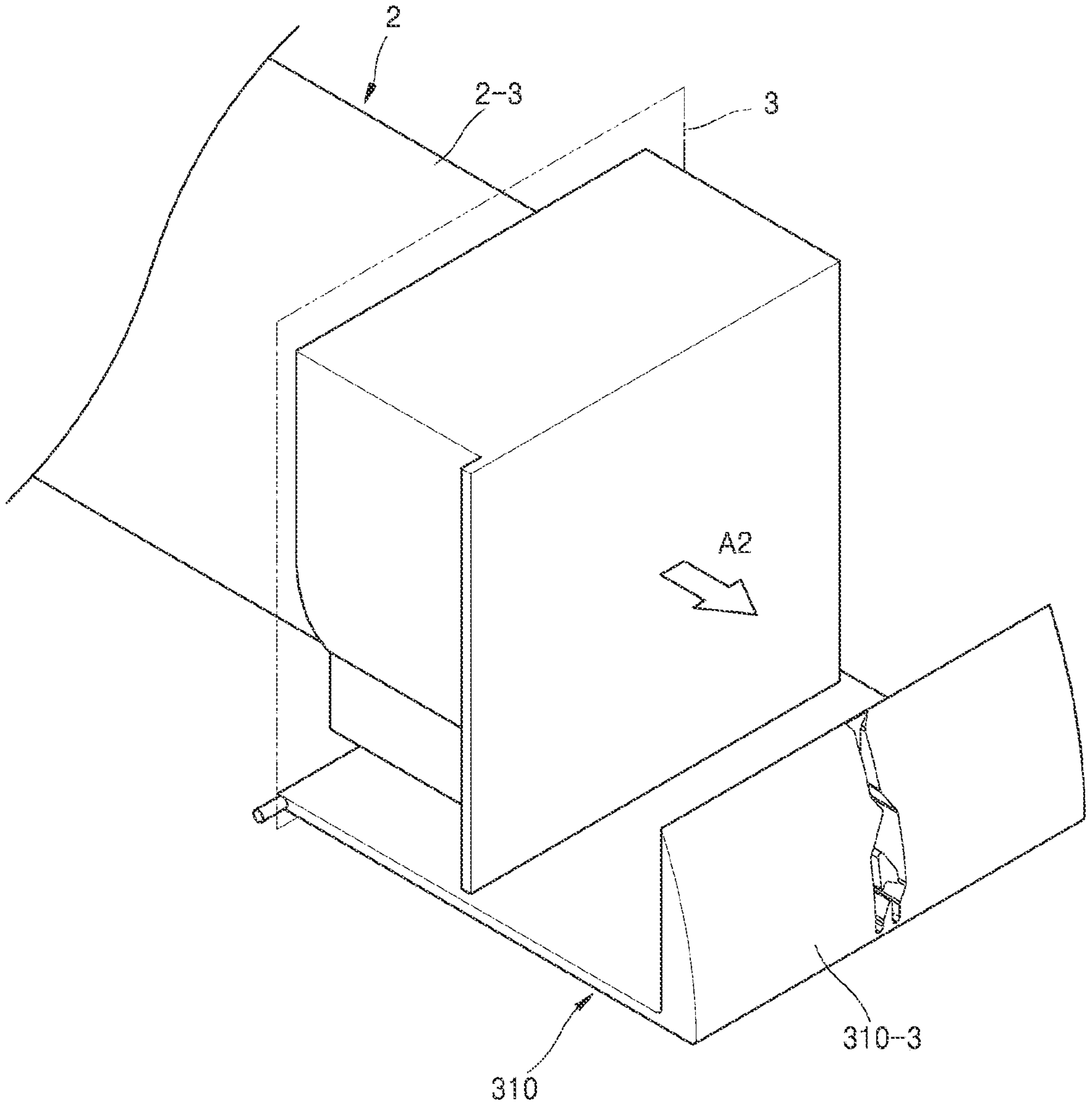
Figure 11:
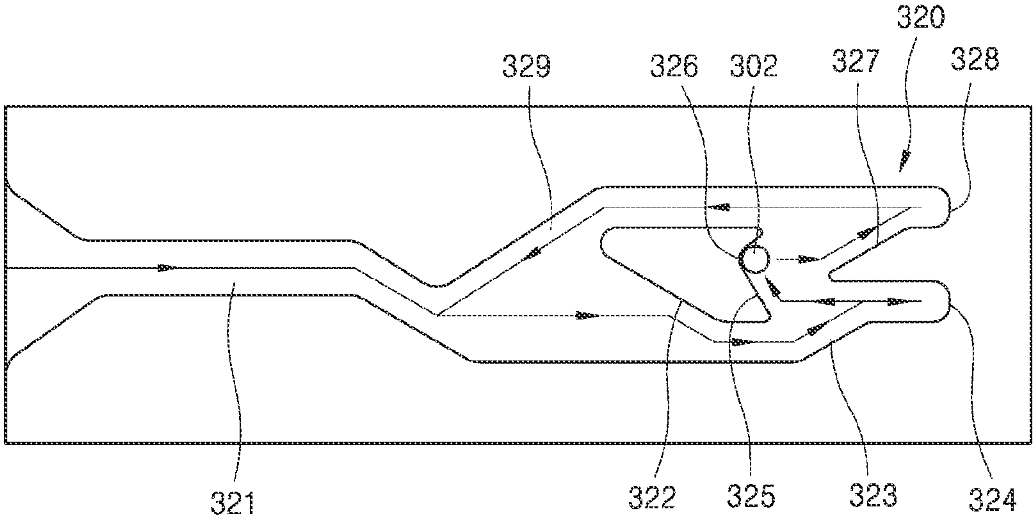
FIG. 11 illustrates a locking path shown in FIG. 5 according to an example.

FIGS. 8 to 10 are schematic perspective views showing a locking member 6-1 according to an example wherein, FIG. 8 illustrates a state in which a door 310 is located at a closing position 310-1 according to an example, FIG. 9 illustrates a state in which the door 310 is located at a pressed position 310-2 according to an example, and FIG. 10 illustrates a state in which the door 310 is located at an opening position 310-3 according to an example. FIG. 11 illustrates a locking path 320 according to an example.

With reference to FIGS. 8 to 11, the door 310 may be provided at the mounting portion 3. The door 310 may be moved, for example, rotated between the opening position 310-3 and the closing position 310-1 in which the mounting portion 3 is opened or closed. The door 310 may move the toner cartridge 2 to the click position 2-2. For example, the door 310 may be moved, for example, rotated to the pressed position 310-2 through the closing position 310-1, in which the toner cartridge 2 is pushed and moved to the click position 2-2. The locking member 6-1 may selectively lock the door 310 at the closing position 310-1 and selectively allow the opening of the door 310 in accordance with a press operation of the door 310. The locking member 6-1 may selectively allow the removal of the toner cartridge 2 by locking/releasing the toner cartridge 2 in accordance with the press operation of the door 310.

For example, the locking member 6-1 may include a locking pin 302 provided at the mounting portion 3 and the locking path 320 arranged at the door 310 to guide the locking pin 302 between the locking position and the releasing position in accordance with the movement of the door 310 between the closing position and the click position. The locking position may be a position in which the door 310 is locked at the closing position, and the releasing position may be a position in which the movement of the door 310 to an opening position is allowed. The locking path 320 may be provided, for example, at an upper portion of the door 310. The locking pin 302 may be provided at an upper portion of the mounting portion 3 opposing the locking path 320. The locking pin 302 may be provided at the mounting portion 3 so that the locking pin 302 may be moved in a direction perpendicular to a moving direction of the door 310, i.e., a direction perpendicular to the mounting direction A1 and the removing direction A2.

The locking path 320 may be implemented in various forms. For example, the locking path 320 may be similar to the locking path 210 described above. With reference to FIG. 11, the locking path 320 may include an entry portion 321, a first guiding portion 322, a second guiding portion 323, a first end portion 324, a third guiding portion 325, a locking portion 326, a fourth guiding portion 327, a second end portion 328, and a fifth guiding portion 329. In a case where the door 310 is rotated between the opening position 310-3 and the closing position 310-1, the locking pin 302 may enter the locking path 320 through the entry portion 321. The first guiding portion 322 and the second guiding portion 323 may have a shape in which the locking pin 302 is guided to the first end portion 324 in a case where the door 310 is rotated between the closing position 310-1 and the pressed position 310-2. The third guiding portion 325 may have a shape in which the locking pin 302 is guided to the locking portion 326 in a case where the door 310 is rotated between the pressed position 310-2 and the closing position 310-1. The fourth guiding portion 327 may have a shape in which the locking pin 302 arranged at the locking portion 326 is guided to the second end portion 328 in a case where the door 310 is rotated between the closing position 310-1 and the pressed position 310-2. The fifth guiding portion 329 may have a shape in which the locking pin 302 is guided to the entry portion 321 in a case where the door 310 is rotated between the pressed position 310-2 and the opening position 310-3 through the closing position 310-1. The click restricting member 5 may allow/block the press operation of the door 310 by allowing/blocking the click operation of the toner cartridge 2.

An example process of removing the toner cartridge 2 is described with reference to FIGS. 1 to 5 and 8 to 11. Referring to FIG. 8, the door 310 may be located at the closing position 310-1. The locking pin 302 may be located at the locking position in which the locking pin 302 is held by the locking portion 326. The toner cartridge 2 may be located at the mounting position 2-1. The blocking member 530 may be located at the first position as shown in FIG. 4. To move the door 310 to the pressed position 310-2, the door 310 may be pressed in the mounting direction A1. The door 310 may push the toner cartridge 2 in the mounting direction A1. The toner cartridge 2 may be blocked by the blocking member 530 and may not be moved from the mounting position 2-1 to the click position 2-2. Therefore, the toner cartridge 2 may remain at the mounting position 2-1, and the door 310 may remain at the closing position 310-1. During the image formation process, the coupler motor 100 may rotate in the forward direction and drive the toner cartridge 2. As the forward rotation power of the coupler motor 100 is blocked by the uni-directional bearing 520, the click restricting shaft 510 may not be rotated, and the blocking member 530 may remain at the first position.

For example, in a case where a remaining amount of toner inside the toner cartridge 2 is less than a reference remaining amount corresponding to the replacement time of the toner cartridge 2, a toner cartridge 2 replacement message may be output through the user interface 9. In a case where the opening of the main door 7 is detected by the door opening/closing sensor 8, a message to request input of a command to execute the toner cartridge replacement may be output on the user interface 9. In a case where the command to execute the toner cartridge replacement is input through the user interface 9, the coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to operations of the pin 511 of the click restricting shaft 510 and the guide slot 531 of the blocking member 530, the blocking member 530 may be moved to the second position apart from the rear end portion 202 of the toner cartridge 2 located at the mounting position 2-1 as shown in FIG. 3. In that case, the click operation of the toner cartridge 2 and the press operation of the door 310 may be performed.

In a case where the door 310 located at the closing position 310-1 is pushed in the mounting direction A1, the toner cartridge 2 may be moved in the mounting direction A1. As shown in FIG. 9, in a case where the door 310 arrives at the pressed position 310-2, the toner cartridge 2 may arrive at the click position 2-2. At this time, the locking pin 302 may be guided to the fourth guiding portion 327 and located at the second end portion 328. Accordingly, the locking of the door 310 may be released. The elastic member 4 may be compressed and push the toner cartridge 2 in the removing direction A2. In this state, in a case where the force pushing the door 310 in the mounting direction A1 is removed, the toner cartridge 2 may be moved toward the mounting position 2-1 by the elastic force of the elastic member 4, and the door 310 may be pushed by the toner cartridge 2 and rotated to the closing position 310-1. In this process, the locking pin 302 may be guided to the fifth guiding portion 329 and enter the entry portion 321 to be located at the releasing position. The locking of the door 310 may be released, and the door 310 may be rotated to the opening position 310-3. The toner cartridge 2 may pass through the mounting position 2-1 and may be moved to the popup position 2-3 in which the front end portion 203 protrudes from an exit of the mounting portion 3 by the elastic force of the elastic member 4 as illustrated in FIG. 10. The door 310 may be pushed by the toner cartridge 2 and be rotated to the opening position 310-3. The user may hold the front end portion 203 of the toner cartridge 2 and pull the toner cartridge 2 in the removing direction A2 to remove the toner cartridge 2 from the mounting portion 3.

To remount the toner cartridge 2 on the mounting portion 3, in a state where the door 310 is located at the opening position 310-3, the rear end portion 202 of the toner cartridge 2 may be arranged at the entrance of the mounting portion 3, and the toner cartridge 2 may be located at the mounting position 2-1 by pushing the toner cartridge 2 in the mounting direction A1. The door 310 may be rotated and moved to the pressed position 310-2. The locking pin 302 may enter the locking path 320 through the entry portion 321. The toner cartridge 2 may be pushed by the door 310 and moved to the click position 2-2. The locking pin 302 may be guided to the first guiding portion 322 and the second guiding portion 323 and arrive at the first end portion 324. In this state, in a case where the force pushing the door 310 in the mounting direction A1 is removed, the toner cartridge 2 may be moved from the click position 2-2 to the mounting position 2-1 by the elastic force of the elastic member 4. The door 310 may be pushed by the toner cartridge 2 and be moved to the closing position 310-1. The locking pin 302 may be guided to the third guiding portion 325. In a case where the toner cartridge 2 arrives at the mounting position 2-1 and the door 310 arrives at the closing position 310-1, the locking pin 301 may be held by the locking portion 326 and located at the locking position, and the door 310 may be locked at the closing position 310-1.

In a case where the main door 7 is closed, the closing of the main door 7 may be detected by the door opening/closing sensor 8. The coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to operations of the pin 511 of the click restricting shaft 510 and the guide slot 531 of the blocking member 530, the blocking member 530 may be moved to the first position in contact with the rear end portion 202 of the toner cartridge 2 located at the mounting position 2-1 as shown in FIG. 4. The movement of the toner cartridge 2 to the click position 2-2 may be blocked. Thus, the toner cartridge 2 may remain locked at the mounting position 2-1.

Figure 12:
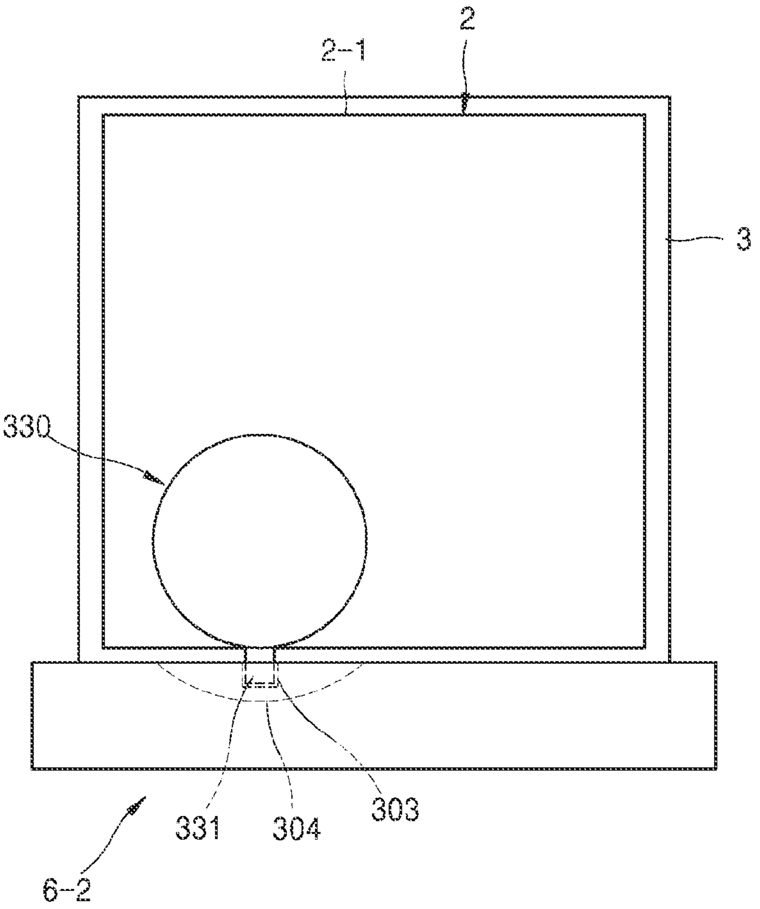
FIGS. 12 and 13 are schematic front views showing a locking member according to an example.
Figure 13:
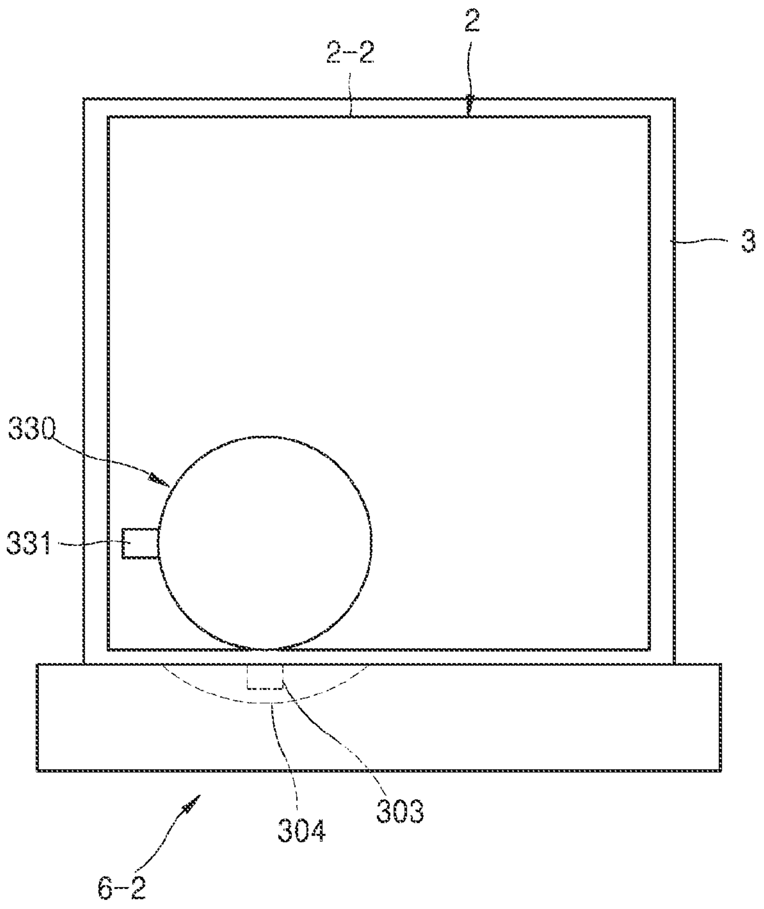
Figure 14:
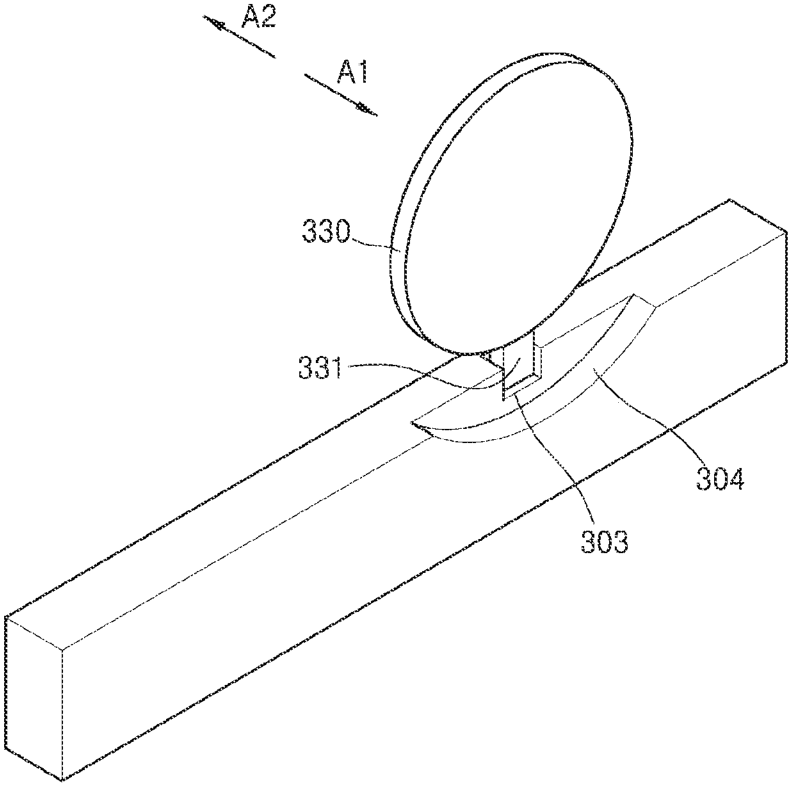
Figure 15:
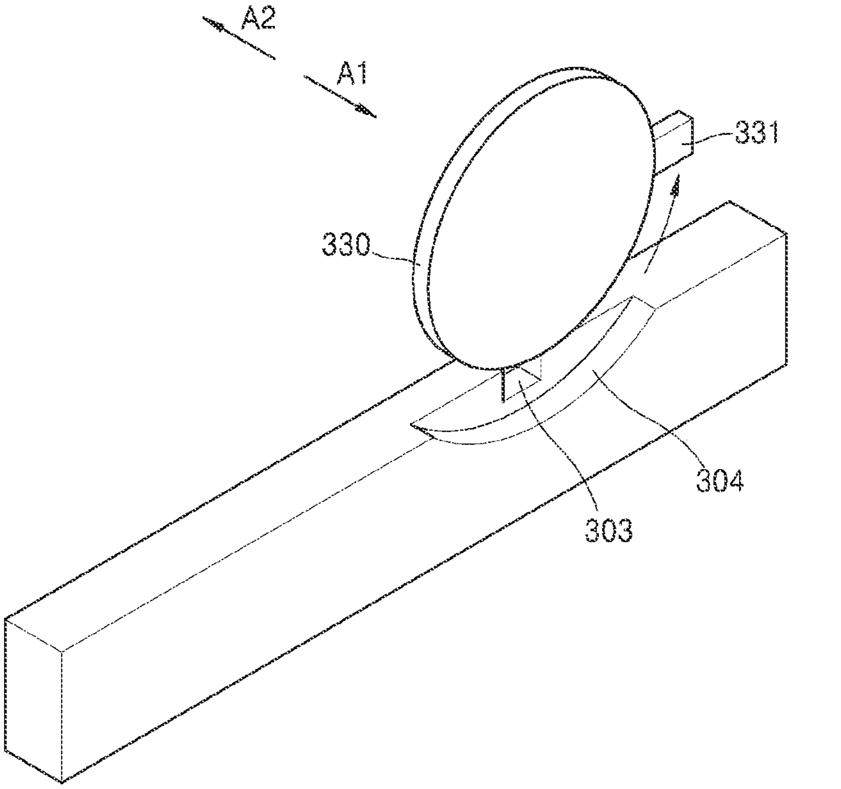

FIGS. 12 and 13 are schematic front views showing a locking member 6-2 according to an example. FIGS. 14 and 15 are schematic perspective views showing the locking member 6-2 according to an example. FIGS. 12 and 14 illustrate a state in which a rotational handle 330 is located at a locking position according to an example, and FIGS. 13 and 15 illustrate a state in which the rotational handle 330 is located at a releasing position according to an example. The toner cartridge 2 is omitted in FIGS. 14 and 15 for convenience in explanation.

With reference to FIGS. 12 to 15, the toner cartridge 2 may include the rotational handle 330. The rotational handle 330 may be provided rotatably at the front end portion 203 of the toner cartridge 2. The rotational handle 330 may be rotated between the locking position, in which the toner cartridge 2 is locked at the mounting position 2-1, and the releasing position, in which the removal of the toner cartridge 2 is allowed. The rotational handle 330 may be moved together with the toner cartridge 2 between the mounting position 2-1 and the click position 2-2. The locking member 6-2 may selectively lock the rotational handle 330 at the locking position or allow rotation of the rotational handle 330 between the locking position and the releasing position in accordance with the click operation of the toner cartridge 2. The locking member 6-2 may not allow the rotation of the rotational handle 330 located at the locking position in a case where the toner cartridge 2 is located at the mounting position 2-1. The locking member 6-2 may allow the rotation of the rotational handle 330 in a case where the toner cartridge 2 is located at the click position 2-2.

For example, the locking member 6-2 may include a trip groove 303 provided at the mounting portion 3 and a trip protrusion 331 provided at the rotational handle 330. The trip protrusion 331 may protrude outward, for example, from an outer circumference portion of the rotational handle 330. The trip groove 303 may be provided near the entrance of the mounting portion 3. The trip protrusion 331 of the rotational handle 330 located at the locking position may be held by the trip groove 303 in a case where the toner cartridge 2 is located at the mounting position 2-1. The trip groove 303 may have a shape to block the trip protrusion 331 so that the rotational handle 330 located at the locking position is not rotated. The trip groove 303 may have a shape to block the movement of the toner cartridge 2 in the removing direction A2. Accordingly, in a state where the toner cartridge 2 is located at the mounting position 2-1, the rotational handle 330 may not be rotated, and the toner cartridge 2 may not be removed. In a case where the toner cartridge 2 is located at the click position 2-2, the trip protrusion 331 may be out of the trip groove 303. For example, in a case where the toner cartridge 2 is located at the click position 2-2, the trip protrusion 331 may be located at a rotation allowing groove 304. The rotation allowing groove 304 may have a shape that does not interfere with the trip protrusion 331 during rotation of the rotational handle 330. Accordingly, in a case where the toner cartridge 2 is located at the click position 2-2, the rotational handle 330 may be rotated between the locking position and the releasing position.

An example process of removing the toner cartridge 2 is described with reference to FIGS. 1 to 6 and 12 to 15. With reference to FIGS. 12 and 14, the toner cartridge 2 may be located at the mounting position 2-1. The rotational handle 330 may be located at the locking position. The trip protrusion 331 of the rotational handle 330 may be held by the trip groove 303. The rotational handle 330 may not be rotated. The blocking member 530 may be located at the first position as shown in FIG. 4. The toner cartridge 2 may be blocked by the blocking member 530 and thus may not be moved from the mounting position 2-1 to the click position 2-2. Therefore, the toner cartridge 2 may remain at the mounting position 2-1, and the rotational handle 330 may remain at the locking position. During an image formation process, the coupler motor 100 may rotate in the forward direction and drive the toner cartridge 2. As the forward rotation power of the coupler motor 100 is blocked by the uni-directional bearing 520, the click restricting shaft 510 may not be rotated, and the blocking member 530 may remain at the first position.

For example, in a case where a remaining amount of toner inside the toner cartridge 2 is less than a reference remaining amount corresponding to the replacement time of the toner cartridge 2, a toner cartridge 2 replacement message may be output through the user interface 9. In a case where the opening of the main door 7 is detected by the door opening/closing sensor 8, a message to request input of a command to execute the toner cartridge replacement may be output on the user interface 9. In a case where the command to execute the toner cartridge replacement is input through the user interface 9, the coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to operations of the pin 511 of the click restricting shaft 510 and the guide slot 531 of the blocking member 530, the blocking member 530 may be moved to the second position apart from the rear end portion 202 of the toner cartridge 2 located at the mounting position 2-1 as shown in FIG. 3. In that case, the click operation of the toner cartridge 2 may become available.

By pushing the toner cartridge 2 in the mounting direction A1, the toner cartridge 2 may be located at the click position 2-2 as shown in FIGS. 13 and 15. The elastic member 4 may be compressed and push the toner cartridge 2 in the removing direction A2. The trip protrusion 331 of the rotational handle 330 may be out of the trip groove 303. The rotation of the rotational handle 330 may be allowed. The rotational handle 330 may be rotated between the locking position and the releasing position so that the trip protrusion 331 is not held by the trip groove 303 in a case where the toner cartridge 2 is moved in the removing direction A2. The toner cartridge 2 may become removable. In a case where the force pushing the toner cartridge 2 in the mounting direction A1 is released, the toner cartridge 2 may be moved to the mounting position 2-1 by the elastic force of the elastic member 4. The toner cartridge 2 may be moved to the popup position 2-3 in which the front end portion 203 protrudes from the exit of the mounting portion 3 through the mounting position 2-1. The user may hold the front end portion 203 of the toner cartridge 2 and pull the toner cartridge 2 in the removing direction A2 to remove the toner cartridge 2 from the mounting portion 3.

To remount the toner cartridge 2 on the mounting portion 3, the rear end portion 202 of the toner cartridge 2 may be arranged at the entrance of the mounting portion 3. In a state where the rotational handle 330 is located at the releasing position, the toner cartridge 2 may be located at the click position 2-2 by pushing the toner cartridge 2 in the mounting direction A1. The rotational handle 330 may be rotated to the locking position. In a case where the force pushing the toner cartridge 2 in the mounting direction A1 is removed, the toner cartridge 2 may be moved to the mounting position 2-1 by the elastic force of the elastic member 4. The trip protrusion 331 of the rotational handle 330 may enter and be held by the trip groove 303, and the rotational handle 330 may be located at the locking position. The toner cartridge 2 may remain at the mounting position 2-1.

In a case where the main door 7 is closed, the closing of the main door 7 may be detected by the door opening/closing sensor 8. The coupler motor 100 may be rotated in the reverse direction. The reverse rotation power of the coupler motor 100 may be delivered to the click restricting shaft 510 by the uni-directional bearing 520, and the click restricting shaft 510 may be rotated in the reverse direction. According to the operations of the pin 511 of the click restricting shaft 510 and the guide slot 531 of the blocking member 530, the blocking member 530 may be moved to the first position in contact with the rear end portion 202 of the toner cartridge 2 located at the mounting position 2-1 as shown in FIG. 4. The movement of the toner cartridge 2 to the click position 2-2 may be blocked. The rotational handle 330 may not be rotated, and remain at the locking position. Thus, the toner cartridge 2 may remain locked at the mounting position 2-1.

In the above examples, the click restricting member 5 may selectively allow the click operation of the toner cartridge 2 by being in contact with/spaced apart from the rear end portion 202 of the toner cartridge 2. In the example of FIG. 8, the click restricting member 5 may selectively allow the press operation of the door 310 by being in contact with/spaced apart from the rear end portion 202 of the toner cartridge 2. There may also be other structures to selectively allow the press operation of the door 310.

Figure 16:
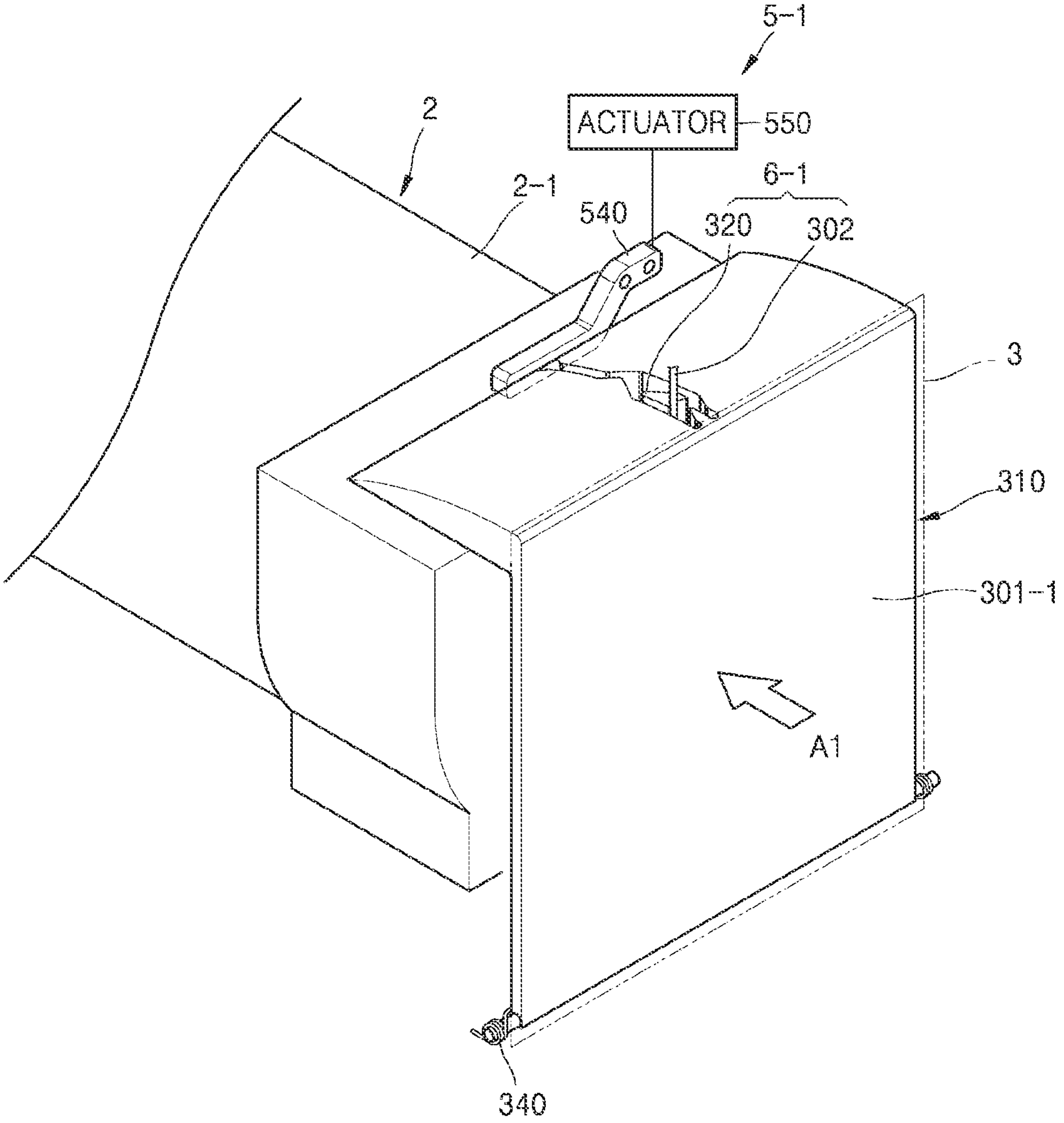
Figure 17:
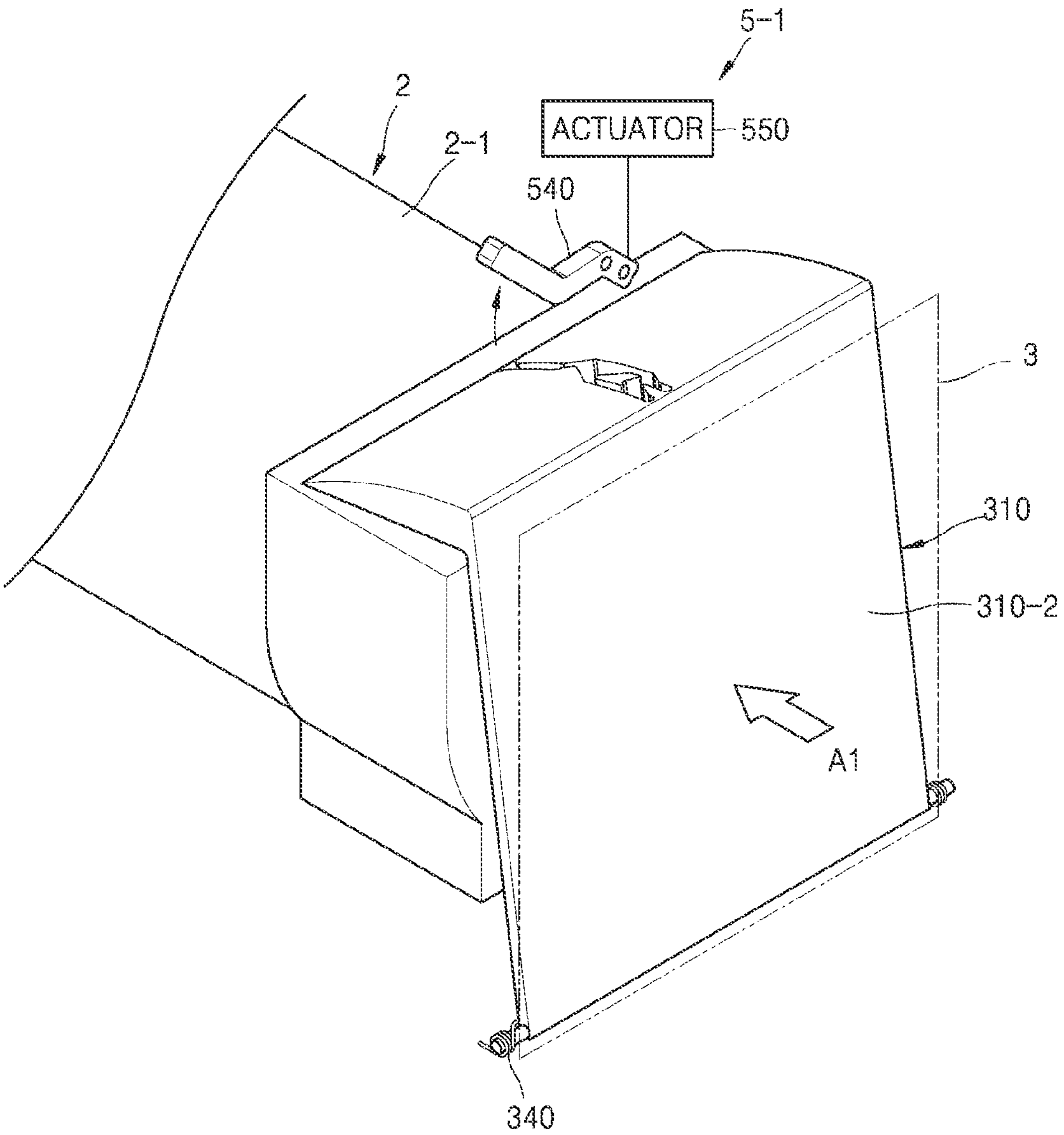
Figure 18:
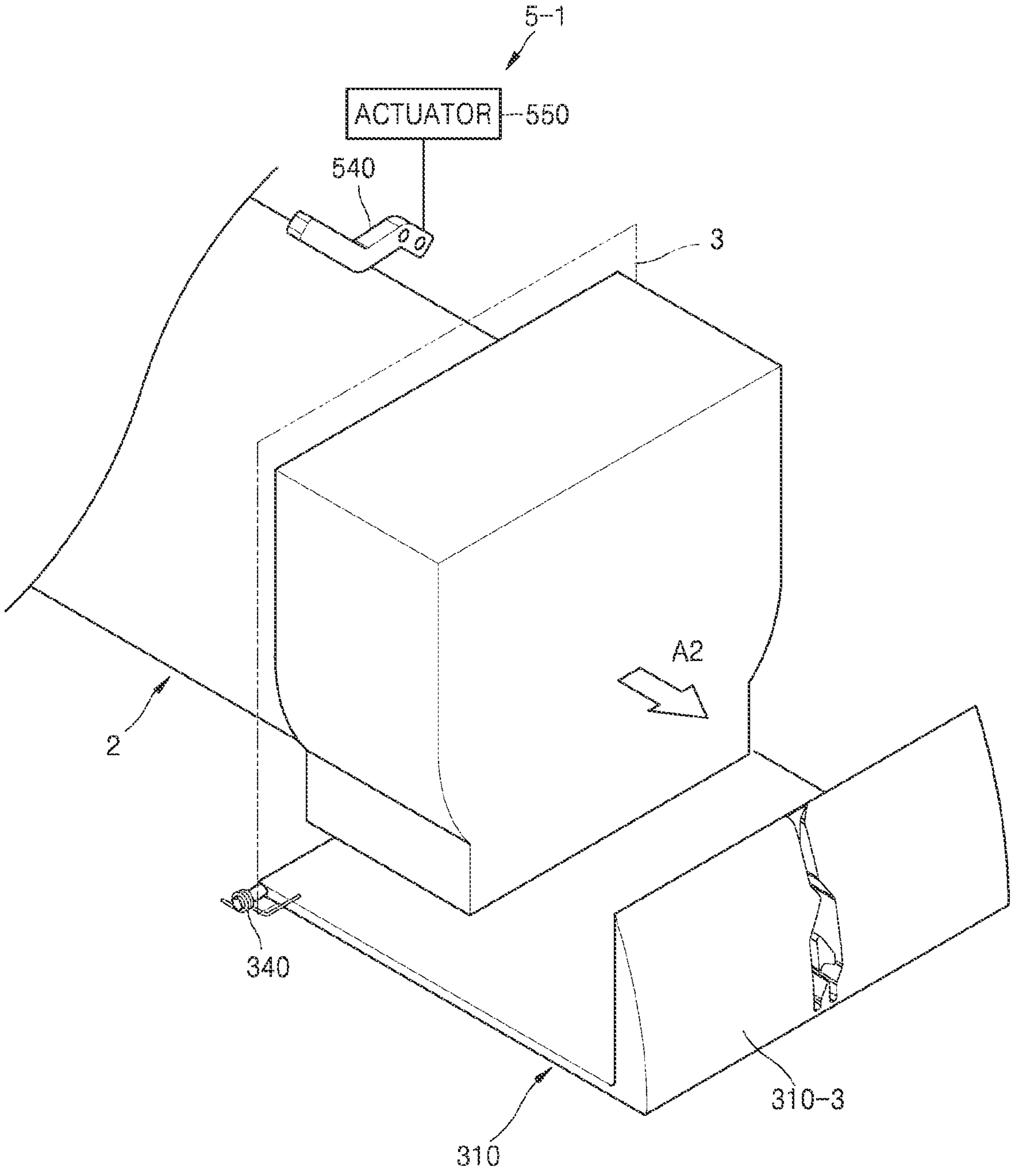

FIGS. 16 to 18 are schematic perspective views showing a click restricting member 5-1 according to an example wherein, FIG. 16 illustrates a state in which the door 310 is located at a closing position 310-1 according to an example, FIG. 17 illustrates a state in which the door 310 is located at a pressed position 310-2 according to an example, and FIG. 18 illustrates a state in which the door 310 is located at an opening position 310-3 according to an example. The example structure illustrated in FIG. 16 may be different from the example structure of FIG. 8 in that the click restricting member 5-1 to selectively allow the removal of the toner cartridge 2 by limiting the press operation of the door 310 instead of the click restricting member 5 illustrated in FIGS. 2 to 5 is employed. Hereafter, examples are described focusing on the differences. Like reference numerals denote like elements as illustrated in FIGS. 8 to 11, and any redundant description is omitted.

With reference to FIGS. 16 to 18, the door 310 may be provided at the mounting portion 3. The door 310 may be moved, for example, rotated between the opening position 310-3 and the closing position 310-1 in which the mounting portion 3 is opened or closed. The door 310 may be moved, for example, rotated to the pressed position 310-2 that further proceeds over the closing position 310-1 in the mounting direction A1. An elastic member 340 may apply an elastic force to the door 310 in a direction to rotate the door 310 to the opening position 310-3. The mounting position 2-1 of the toner cartridge 2 may be a position that does not interfere with the press operation of the door 310. The locking member 6-1 may selectively lock the door 310 at the closing position 310-1 in accordance with the press operation of the door 310, and selectively allow opening of the door 310. The locking member 6-1 may selectively allow the removal of the toner cartridge 2 by locking/releasing the door 310 at/from the closing position 310-1 in accordance with the press operation of the door 310. For example, the locking member 6-1 may include the locking pin 302 provided at the mounting portion 3 and the locking path 320 arranged at the door 310 to guide the locking pin 301 between the locking position and the releasing position. The structure of the locking path 320 may be the same as described with reference to FIG. 11. The click restricting member 5-1 may selectively allow the rotation of the door 310 between the closing position 310-1 and the pressed position 310-2. For example, the click restricting member 5-1 may include a blocking member 540 and an actuator 550. The blocking member 540 may be moved between a blocking position, in which the rotation of the door 310 from the closing position 310-1 to the pressed position 310-2 is blocked by the blocking member 540 (a position illustrated in FIG. 16), and a retraction position, in which the rotation of the door 310 from the closing position 310-1 to the pressed position 310-2 is allowed (a position illustrated in FIG. 17). The actuator 550 may move the blocking member 540 between the blocking position and the retraction position. For example, the blocking member 540 may be provided at the mounting portion 3 to rotate between the blocking position and the retraction position. The actuator 550 may be implemented by, for example, a solenoid, a linear motor, etc.

An example process of removing the toner cartridge 2 is described with reference to FIGS. 11 and 16 to 18. As illustrated in FIG. 16, in a case where the door 310 is located at the closing position 310-1, the locking pin 302 may be located at the locking position in which the locking pin 302 is held by the locking portion 326, and the door 310 may remain at the closing position 310-1. The toner cartridge 2 may be located at the mounting position 2-1. The blocking member 540 may be located at the blocking position as shown in FIG. 16. Even in a case where the door 310 is pressed in the mounting direction A1 to move the door 310 to the pressed position 310-2, the door 310 is blocked by the blocking member 540, and thus, may not be moved to the pressed position 310-2. Accordingly, the door 310 may remain at the closing position 310-1, and the toner cartridge 2 may remain at the mounting position 2-1. A process of forming an image may be performed in this state.

For example, in a case where a remaining amount of toner inside the toner cartridge 2 is less than a reference remaining amount corresponding to the replacement time of the toner cartridge 2, a toner cartridge 2 replacement message may be output through the user interface 9. In a case where the opening of the main door 7 is detected by the door opening/closing sensor 8, a message to request input of a command to execute the toner cartridge replacement may be output on the user interface 9. In a case where the command to execute the toner cartridge replacement is input through the user interface 9, the actuator 550 may rotate the blocking member 540 to the retraction position as illustrated in FIG. 17. In that case, the press operation of the door 310 may be performed.

As illustrated in FIG. 17, in a case where the door 310 is pushed in the mounting direction A1, the door 310 may arrive at the pressed position 310-2. The locking pin 302 may be off the locking portion 326 and guided to the fourth guiding portion 327 to be located at the second end portion 328. Accordingly, the locking of the door 310 may be released, and the door 310 may be rotated to the opening position 310-3. In this state, in a case where the force pushing the door 310 in the mounting direction A1 is removed, the door 310 may be rotated to the closing position 310-1 by the elastic force of the elastic member 340. During this process, the locking pin 302 may be guided to the fifth guiding portion 329 and enter the entry portion 321. The door 310 may be rotated to the opening position 310-3 by the elastic force of the elastic member 340 as illustrated in FIG. 18. The user may hold the front end portion 203 of the toner cartridge 2 and pull the toner cartridge 2 in the removing direction A2 to remove the toner cartridge 2 from the mounting portion 3.

To remount the toner cartridge 2 on the mounting portion 3, in a state where the door 310 is located at the opening position 310-3, the rear end portion 202 of the toner cartridge 2 may be arranged at the entrance of the mounting portion 3, and the toner cartridge 2 may be located at the mounting position 2-1 by pushing the toner cartridge 2 in the mounting direction A1. The door 310 may be rotated and moved to the pressed position 310-2 as illustrated in FIG. 17. The locking pin 302 may enter the locking path 320 through the entry portion 321. The locking pin 302 may be guided to the first guiding portion 322 and the second guiding portion 323 and arrive at the first end portion 324. In this state, in a case where the force pushing the door 310 in the mounting direction A1 is removed, the door 310 may be moved to the closing position 310-1 by the elastic force of the elastic member 340. The locking pin 302 may be guided to the third guiding portion 325. In a case where the door 310 arrives at the closing position 310-1, the locking pin 301 may be held by the locking portion 326, and the door 310 may be locked at the closing position 310-1.

In a case where the main door 7 is closed, the closing of the main door 7 may be detected by the door opening/closing sensor 8. The blocking member 540 may be returned to the blocking position by the actuator 550. The click operation of the door 310 may be blocked. Accordingly, the door 310 may remain locked at the closing position 310-1, and the removal of the toner cartridge may not be allowed.

Figure 19:
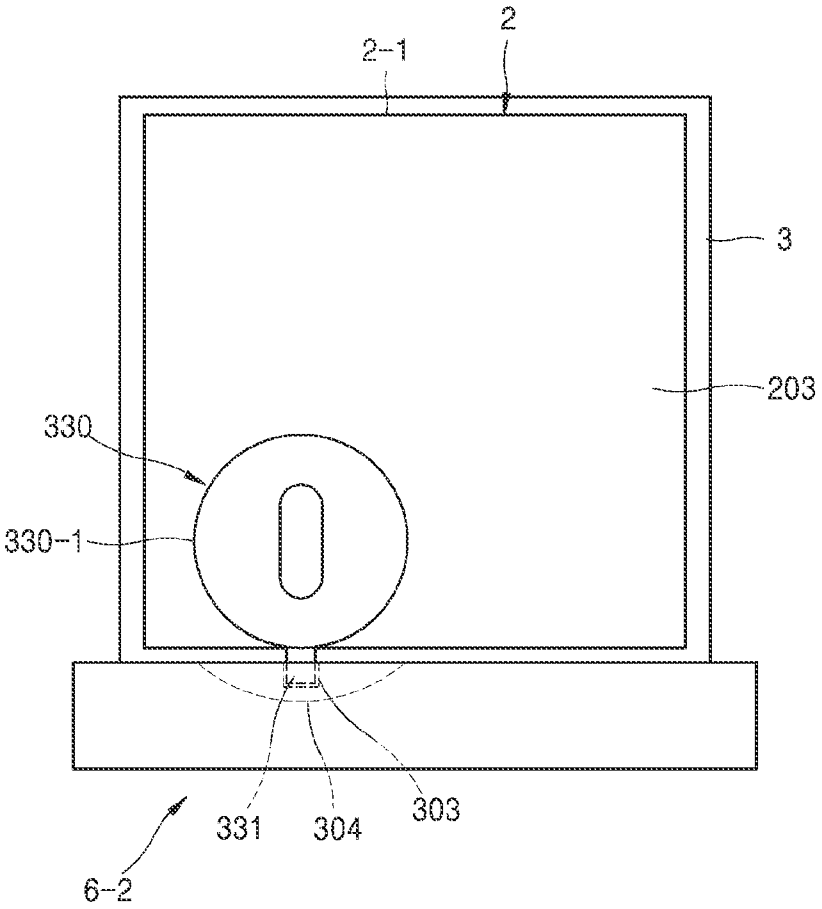
FIG. 19 is a schematic front view showing a state in which a rotational handle is located at a locking position according to an example.
Figure 20:
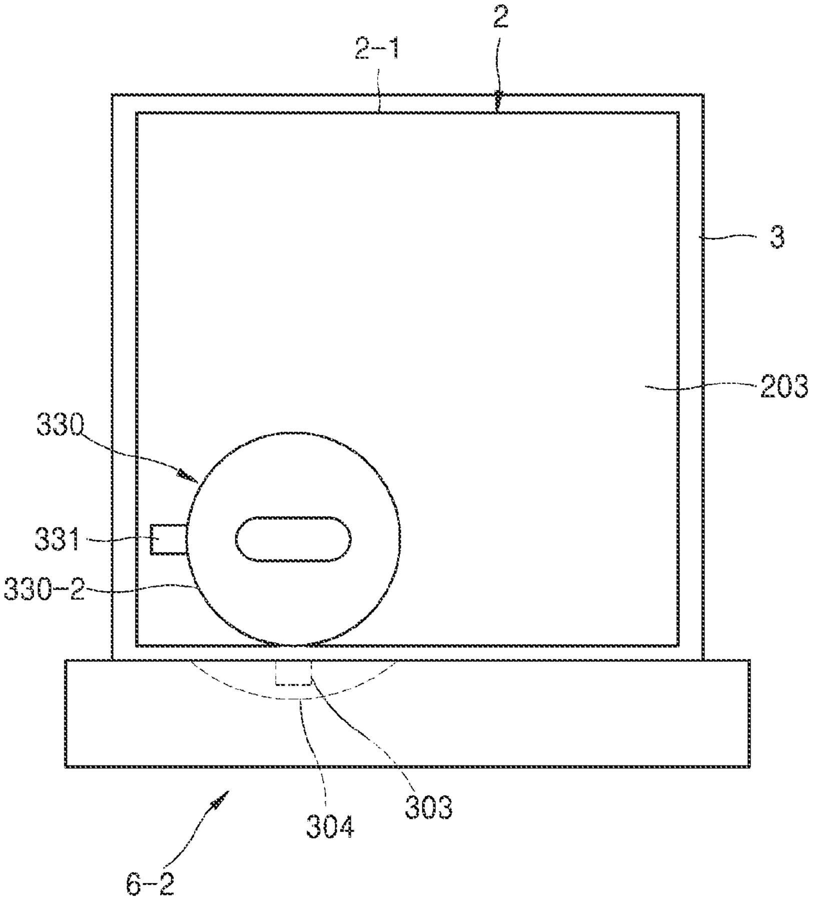
FIG. 20 is a schematic front view showing a state in which a rotational handle is located at a releasing position according to an example.
Figure 21:
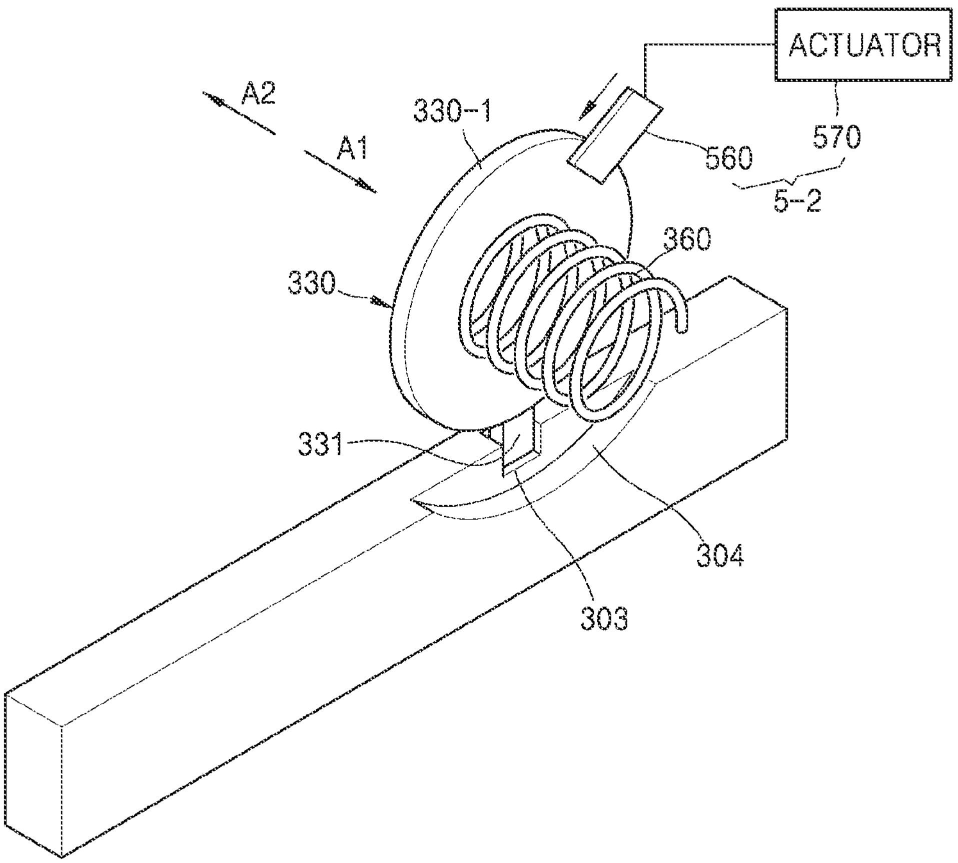
FIG. 21 is a schematic prospective view showing a state in which a rotational handle is located at a holding position according to an example.
Figure 22:
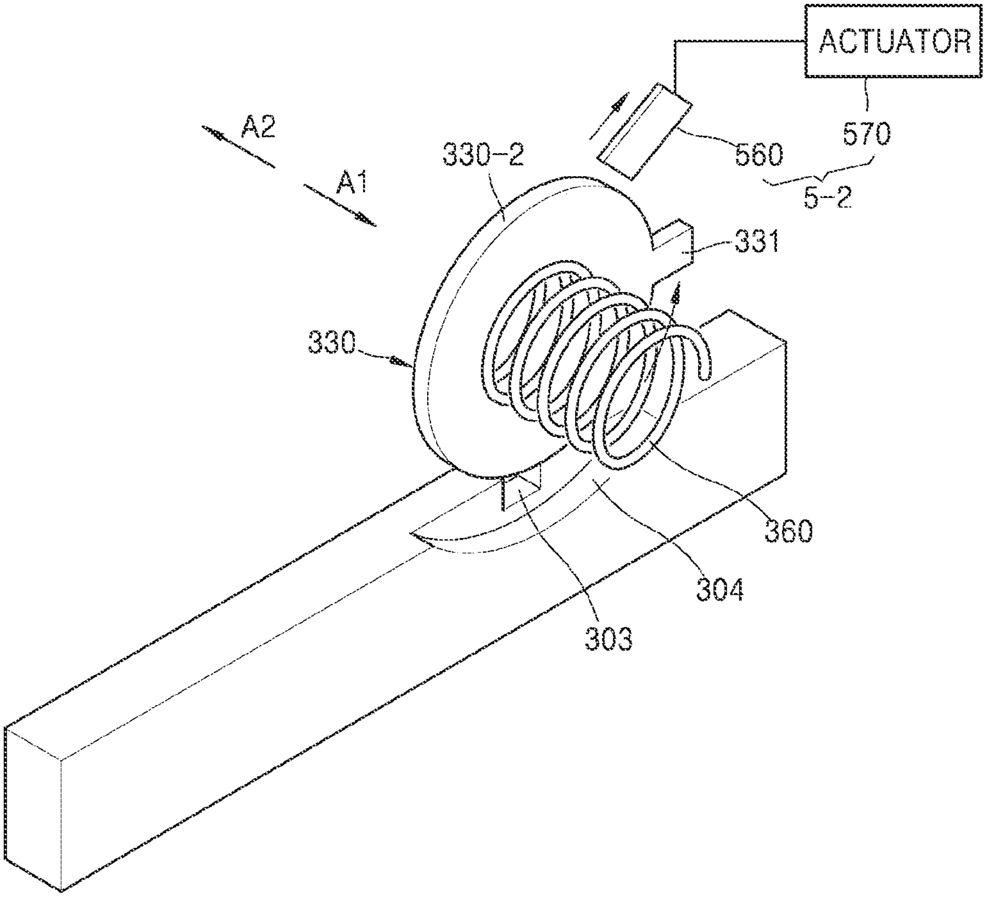
FIG. 22 is a schematic prospective view showing a state in which a rotational handle is located at a pressed position according to an example.

FIG. 19 is a schematic front view showing a state in which the rotational handle 330 is located at a locking position according to an example. FIG. 20 is a schematic front view showing a state in which the rotational handle 330 is located at a releasing position according to an example. FIG. 21 is a schematic prospective view showing a state in which the rotational handle 330 is located at a holding position according to an example. FIG. 22 is a schematic prospective view showing a state in which the rotational handle 330 is located at a pressed position according to an example. In FIGS. 12 to 15, the rotational handle 330 may be provided at the main body 1, for example, at the mounting portion 3, and the switch of the rotational handle 330 between the locking position and the releasing position may be selectively allowed by the click operation of the toner cartridge 2. In an example as illustrated with reference to FIGS. 19 to 22, the rotational handle 330 may be provided at the toner cartridge 2, facilitating the press operation. The click restricting member 5-2 may selectively allow the rotation of the rotational handle 330 between the locking position and the releasing position by selectively allowing the press operation of the rotational handle 330. Hereafter, like reference numerals denote like elements as illustrated in FIGS. 12 to 15, and any redundant description is omitted.

With reference to FIGS. 19 to 22, the rotational handle 330 may be provided at the toner cartridge 2, for example, at the front end portion 203 of the toner cartridge 2. The rotational handle 330 may be rotated between the locking position, in which the toner cartridge 2 is locked at the mounting position 2-1, and the releasing position, in which the removal of the toner cartridge 2 is allowed. The rotational handle 330 may be moved between a holding position 330-1, in which the rotation between the locking position and the releasing position is blocked, and a pressed position 330-2, in which the rotation between the locking position and the releasing position is allowed. For example, the rotational handle 330 may be pressed in the mounting direction A1 and moved between the holding position 330-1 and the pressed position 330-2. The locking member 6-2 may selectively lock the rotational handle 330 at the locking position or allow rotation of the rotational handle 330 between the locking position and the releasing position in accordance with the press operation of the rotational handle 330. The locking member 6-2 may not allow the rotation of the rotational handle 330 located at the locking position in a case where the rotational handle 330 is located at the holding position 330-1. The locking member 6-2 may allow the rotation of the rotational handle 330 in a case where the rotational handle 330 is located at the pressed position 330-2. The click restricting member 5-2 may selectively allow the movement of the rotational handle 330 between the holding position 330-1 and the pressed position 330-2 and the press operation. An elastic member 360 may apply an elastic force to the rotational handle 330 in a direction returning to the holding position 330-1. The elastic member 360 may be implemented by, for example, a compressive coiled spring arranged between the toner cartridge 2 and the rotational handle 330.

For example, the click restricting member 5-2 may selectively allow the movement of the rotational handle 330 between the holding position 330-1 and the pressed position 330-2. For example, the click restricting member 5-2 may include a blocking member 560 and an actuator 570. The blocking member 560 may be moved between the blocking position, in which the movement of the rotational handle 330 between the holding position 330-1 and the blocking position is blocked by the blocking member 560 (a position illustrated in FIG. 21), and the retraction position, in which the movement of the rotational handle 330 between the holding position 330-1 and the pressed position 330-2 is allowed (a position illustrated in FIG. 22). The actuator 570 may move the blocking member 560 between the blocking position and the retraction position. For example, the blocking member 560 may be provided at the main body 1, for example, at the mounting portion 3 to rotate between the blocking position and the retraction position. The actuator 570 may be implemented by, for example, a solenoid, a linear motor, etc.

For example, the locking member 6-2 may include a trip groove 303 provided at the mounting portion 3 and a trip protrusion 331 provided at the rotational handle 330. The trip protrusion 331 may protrude outward, for example, from an outer circumference portion of the rotational handle 330. The trip groove 303 may be provided near the entrance of the mounting portion 3. The trip protrusion 331 of the rotational handle 330 located at the locking position may be held by the trip groove 303 in a case where the toner cartridge 2 is located at the mounting position 2-1. The trip groove 303 may have a shape to block the trip protrusion 331 so that the rotational handle 330 located at the locking position is not rotated. The trip groove 303 may have a shape to block the movement of the toner cartridge 2 in the removing direction A2. Accordingly, in a state where the toner cartridge 2 is located at the mounting position 2-1, and the rotational handle 330 is located at the holding position 330-1, the rotational handle 330 may not be rotated, and the toner cartridge 2 may not be removed. In a case where the rotational handle 330 is located at the pressed position 330-2, the trip protrusion 331 may be out of the trip groove 303. For example, in a case where the rotational handle 330 is located at the pressed position 330-2, the trip protrusion 331 may be located at a rotation allowing groove 304. The rotation allowing groove 304 may have a shape that does not interfere with the trip protrusion 331 during rotation of the rotational handle 330. Accordingly, in a case where the rotational handle 330 is located at the pressed position 330-2, the rotational handle 330 may be rotated between the locking position and the releasing position.

With reference to FIGS. 19 to 22, an example process of removing the toner cartridge 2 is described. As illustrated in FIGS. 19 and 21, the rotational handle 330 may be located at the holding position 330-1, and the trip protrusion 331 may be located at the locking position in which the trip protrusion 331 is held by the trip groove 303. The toner cartridge 2 may be located at the mounting position 2-1. The blocking member 560 may be located at the blocking position. Even in a case where the rotational handle 330 is pushed in the mounting direction A1 to move the rotational handle 330 to the pressed position 330-2, the rotational handle 330 may be blocked by the blocking member 560 and thus, may not be moved to the pressed position 330-2. Accordingly, the rotational handle 330 may remain at the holding position 330-1, and the toner cartridge 2 may remain at the mounting position 2-1. A process of forming an image may be performed in this state.

For example, in a case where a remaining amount of toner inside the toner cartridge 2 is less than a reference remaining amount corresponding to the replacement time of the toner cartridge 2, a toner cartridge 2 replacement message may be output through a user interface 9. In a case where the opening of the main door 7 is detected by the door opening/closing sensor 8, a message to request input of a command to execute the toner cartridge replacement may be output on the user interface 9. In a case where the command to execute the toner cartridge replacement is input through the user interface 9, the actuator 570 may move the blocking member 560 to the retraction position as illustrated in FIG. 22. In that case, the press operation of the rotational handle 330 may be performed.

As illustrated in FIG. 22, in a case where the rotational handle 330 is pushed in the mounting direction A1, the rotational handle 330 may arrive at the pressed position 330-2. The trip protrusion 331 may be out of the trip groove 303 and may be located at the rotation allowing groove 304. The rotational handle 330 may be rotated to be located at the releasing position. The locking of the toner cartridge 2 may be released. The user may hold the front end portion 203 of the toner cartridge 2 and pull the toner cartridge 2 in the removing direction A2 to remove the toner cartridge 2 from the mounting portion 3.

To remount the toner cartridge 2 on the mounting portion 3, in a state where the rotational handle 330 is located at the releasing position, the rear end portion 202 of the toner cartridge 2 may be arranged at the entrance of the mounting portion 3, and the toner cartridge 2 may be located at the mounting position 2-1 by pushing the toner cartridge 2 in the mounting direction A1. The rotational handle 330 may be pushed and moved to the pressed position 310-2 as illustrated in FIG. 22. The rotational handle 330 may be rotated to the locking position to arrange the trip protrusion 331 at the trip groove 303. In a case where the force pushing the rotational handle 330 is removed, the rotational handle 330 may be returned to the holding position by the elastic force of the elastic member 360. The trip protrusion 331 may be held by the trip groove 303, and the toner cartridge 2 may be locked at the mounting position 2-1. In a case where the main door 7 is closed, the closing of the main door 7 may be detected by the door opening/closing sensor 8. The blocking member 560 may be returned to the blocking position by the actuator 570. The press operation of rotational handle 330 may be blocked. Accordingly, the rotational handle 330 may remain locked at the holding position 330-1, and the removal of the toner cartridge 2 may not be allowed.

Examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:
- a mounting portion;
- a toner cartridge movable between a mounting position, in which the toner cartridge is mounted to the mounting portion, and a click position that further proceeds from the mounting position in a mounting direction;
- an elastic member to apply an elastic force to the toner cartridge in a direction returning from the click position;
- a locking member to selectively allow removal of the toner cartridge from the mounting portion in accordance with a click operation by which the toner cartridge is moved between the click position and the mounting position; and
- a click restricting member to selectively allow movement of the toner cartridge between the mounting position and the click position.

2. The image forming apparatus of claim 1, further comprising a coupler motor arranged at the mounting portion to drive the toner cartridge located at the mounting position,
- wherein the click restricting member is driven by the coupler motor.

3. The image forming apparatus of claim 1, wherein the click restricting member comprises:
- a click restricting shaft; and
- a blocking member connected to the click restricting shaft and movable between a first position and a second position in which movement of the toner cartridge to the click position is respectively blocked and allowed according to rotation of the click restricting shaft.

4. The image forming apparatus of claim 1, wherein the locking member comprises:
- a locking pin arranged at the mounting portion; and
- a locking path arranged at the toner cartridge to guide the locking pin between a locking position, in which the toner cartridge is locked at the mounting position, and a releasing position, in which removal of the toner cartridge is allowed in accordance with the click operation of the toner cartridge.

5. The image forming apparatus of claim 1, further comprising a door movable between an opening position and a closing position, in which the mounting portion is respectively opened or closed, and a pressed position, in which the toner cartridge is moved to the click position,
- wherein the locking member is to selectively lock the door at the closing position.

6. The image forming apparatus of claim 1, further comprising a door movable between an opening position and a closing position, in which the mounting portion is respectively opened or closed, and a pressed position, in which the toner cartridge is pushed and moved to the click position,
- wherein the locking member comprises:
  - a locking pin arranged at the mounting portion; and
  - a locking path arranged at the door to guide the locking pin between a locking position, in which the door is locked at the closing position, and a releasing position, in which movement of the door to an opening position is allowed in accordance with movement of the door between the closing position and click position.

7. The image forming apparatus of claim 1, further comprising a rotational handle provided at the toner cartridge to rotate between a locking position, in which the toner cartridge is locked at the mounting position, and a releasing position, in which removal of the toner cartridge is allowed,
- wherein the locking member is to selectively lock the rotational handle at the locking position.

8. An image forming apparatus comprising:
- a mounting portion on which a toner cartridge is mounted;
- a door movable between an opening position and a closing position, in which the mounting portion is respectively opened or closed, and a pressed position that proceeds from the closing position;
- a locking member to selectively allow opening of the door in accordance with a press operation by which the door is moved between the closing position and the pressed position; and
- a click restricting member to selectively allow movement of the door between the closing position and the pressed position.

9. The image forming apparatus of claim 8, wherein the click restricting member comprises:
- a blocking member movable between a blocking position, in which movement of the door from the closing position to the pressed position is blocked, and a retraction position retracted from the blocking position; and an actuator to move the blocking member between the blocking position and the retraction position.

10. The image forming apparatus of claim 8, further comprising an elastic member to apply an elastic force to the door in a direction returning from the pressed position.

11. The image forming apparatus of claim 8, wherein the door is to push the toner cartridge by movement of the door between the closing position and the pressed position and between a mounting position and a click position, and wherein the click restricting member is to selectively allow movement of the toner cartridge between the mounting position and the click position.

12. The image forming apparatus of claim 11, further comprising:

a coupler motor arranged at the mounting portion to drive the toner cartridge located at the mounting position; and an elastic member to apply an elastic force to the toner cartridge in a direction returning from the click position, wherein the click restricting member is driven by the coupler motor.

13. An image forming apparatus comprising:

a mounting portion;

a toner cartridge removable from the mounting portion;

a rotational handle, arranged at the toner cartridge, rotatable between a locking position, in which the toner cartridge is locked at the mounting position, and a releasing position, in which removal of the toner cartridge is allowed, and movable between a holding position, in which rotation between the locking position and the releasing position is blocked, and a pressed position, in which the rotation between the locking position and the releasing position is allowed;

an elastic member to apply an elastic force to the rotational handle in a direction returning from the pressed position; and a click restricting member to selectively allow movement of the rotational handle to the pressed position.

14. The image forming apparatus of claim 13, wherein the click restricting member comprises:

a blocking member movable between a blocking position, in which movement of the rotational handle from the holding position to the pressed position is blocked, and a retraction position spaced apart from the blocking position; and an actuator to move the blocking member between the blocking position and the retraction position.

15. The image forming apparatus of claim 13, further comprising:

a trip groove arranged at the mounting portion; and a trip protrusion, arranged at the rotational handle, to be held by the trip groove so that the rotational handle located at the holding position and the locking position is not rotated to lock the toner cartridge at the mounting position, and to be released from the trip groove in a case where the rotational handle is located at the pressed position.

* * * * *